(12) United States Patent
Oh et al.

(10) Patent No.: US 10,536,665 B2
(45) Date of Patent: Jan. 14, 2020

(54) DEVICE FOR TRANSMITTING BROADCAST SIGNAL, DEVICE FOR RECEIVING BROADCAST SIGNAL, METHOD FOR TRANSMITTING BROADCAST SIGNAL, AND METHOD FOR RECEIVING BROADCAST SIGNAL

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/074,679

(22) PCT Filed: Feb. 1, 2017

(86) PCT No.: PCT/KR2017/001077
§ 371 (c)(1),
(2) Date: Aug. 1, 2018

(87) PCT Pub. No.: WO2017/135673
PCT Pub. Date: Aug. 10, 2017

(65) Prior Publication Data
US 2019/0045156 A1 Feb. 7, 2019

Related U.S. Application Data

(60) Provisional application No. 62/289,863, filed on Feb. 1, 2016, provisional application No. 62/294,317, filed
(Continued)

(51) Int. Cl.
*H04N 7/035* (2006.01)
*H04N 7/015* (2006.01)
(Continued)

(52) U.S. Cl.
CPC .......... *H04N 7/0352* (2013.01); *H04N 7/015* (2013.01); *H04N 7/0117* (2013.01); *H04N 7/54* (2013.01);
(Continued)

(58) Field of Classification Search
CPC .... H04N 7/0352; H04N 7/0117; H04N 7/015; H04N 7/56; H04N 7/54; H04N 9/67; H04N 21/00; H04H 20/18
(Continued)

(56) References Cited

U.S. PATENT DOCUMENTS

| | | | |
|---|---|---|---|
| 10,382,735 B2 * | 8/2019 | Husak | H04N 11/20 |
| 2011/0157245 A1 | 6/2011 | Young | |
| 2012/0026405 A1 * | 2/2012 | Atkins | G11B 27/034 348/651 |
| 2015/0249848 A1 * | 9/2015 | Holman | H04N 21/23439 348/469 |

(Continued)

FOREIGN PATENT DOCUMENTS

| | | |
|---|---|---|
| KR | 1020080024392 A | 3/2008 |
| WO | 2015008987 A1 | 1/2015 |
| WO | 2015178598 A1 | 11/2015 |

*Primary Examiner* — Jefferey F Harold
*Assistant Examiner* — Mustafizur Rahman
(74) *Attorney, Agent, or Firm* — Dentons US LLP

(57) ABSTRACT

Provided in the present invention is a method for transmitting a broadcast signal. The method for transmitting a broadcast signal, according to the present invention, provides a system capable of supporting a next-generation broadcast service in an environment supporting a next-generation hybrid broadcast which uses a terrestrial broadcast network and an Internet network. Also provided is an efficient way of signaling encompassing the terrestrial broadcast network and the Internet network in the environment supporting the next-generation hybrid broadcast.

12 Claims, 32 Drawing Sheets

Related U.S. Application Data on Feb. 12, 2016, provisional application No. 62/303,397, filed on Mar. 4, 2016.

(51) Int. Cl.

| | |
|---|---|
| *H04N 7/54* | (2006.01) |
| *H04N 7/01* | (2006.01) |
| *H04N 7/56* | (2006.01) |
| *H04N 21/00* | (2011.01) |
| *H04N 9/67* | (2006.01) |
| *H04H 20/18* | (2008.01) |

(52) U.S. Cl.
CPC .............. *H04N 7/56* (2013.01); *H04N 9/67* (2013.01); *H04N 21/00* (2013.01); *H04H 20/18* (2013.01)

(58) Field of Classification Search
USPC ......... 348/464, 469, 432.1, 429.1, 314, 242, 348/196, 38, 24, 500, 517, 527, 557, 560, 348/562, 566, 706, 708, 713, 712, 719, 348/723, 725, 729; 382/162, 166
See application file for complete search history.

(56) References Cited

U.S. PATENT DOCUMENTS

| | | | |
|---|---|---|---|
| 2015/0326635 A1* | 11/2015 | Yarygin | H04L 65/608 709/219 |
| 2016/0134870 A1* | 5/2016 | Lu | H04N 19/147 375/240.03 |
| 2016/0165256 A1* | 6/2016 | Van Der Vleuten | H04N 9/68 |
| 2016/0205370 A1* | 7/2016 | Wallace | G06T 5/007 348/571 |
| 2016/0205371 A1* | 7/2016 | Wallace | G06T 5/007 348/571 |
| 2016/0205372 A1* | 7/2016 | Liu | H04N 5/20 |
| 2016/0309154 A1* | 10/2016 | Rusanovskyy | H04N 19/159 |
| 2016/0345032 A1* | 11/2016 | Tsukagoshi | H04N 21/84 |
| 2017/0085894 A1* | 3/2017 | Ramasubramonian | H04N 19/46 |
| 2017/0105014 A1* | 4/2017 | Lee | H04N 19/30 |
| 2017/0155966 A1* | 6/2017 | Oh | H04N 21/2362 |
| 2017/0186141 A1* | 6/2017 | Ha | G06T 5/009 |
| 2018/0014040 A1* | 1/2018 | Tsukagoshi | H04N 21/2343 |
| 2018/0027262 A1* | 1/2018 | Reinhard | H04N 19/70 382/166 |
| 2018/0270512 A1* | 9/2018 | Tsukagoshi | H04N 5/278 |

\* cited by examiner

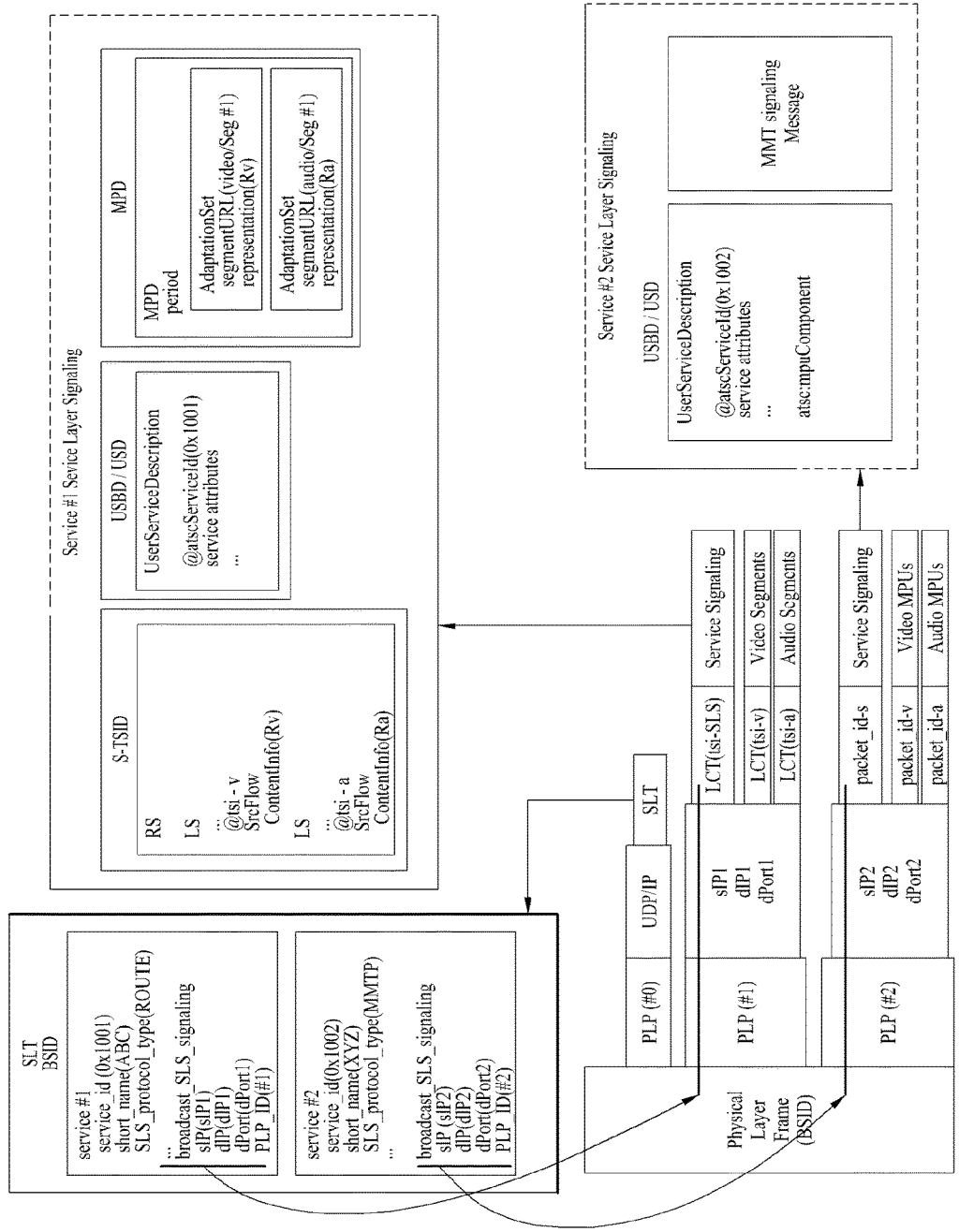

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string |

—t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | |   @tsi | 1 | unsignedInt |
| | |   @PLPID | 0..1 | unsignedByte |
| | |   @bw | 0..1 | unsignedInt |
| | |   @startTime | 0..1 | dateTime |
| | |   @endTime | 0..1 | dateTime |
| | |   ScrFlow | 0..1 | scrFlowType |
| | |   RepairFlow | 0..1 | rprFlowType | t4020

FIG. 5

| Element or Attribute Name | | | | | Use |
|---|---|---|---|---|---|
| bundleDescription | | | | | |
| | userServiceDescription | | | | |
| | | @globalServiceID | | | M |
| | | @serviceID | | | M |
| | | Name | | | 0..N |
| | | | @lang | | CM |
| | | serviceLanguage | | | 0..N |
| | | contentAdvisoryRating | | | 0..1 |
| | | Channel | | | 1 |
| | | | @serviceGenre | | 0..1 |
| | | | @serviceIcon | | 1 |
| | | | ServiceDescription | | 0..N |
| | | | | @serviceDescrText | 1 |
| | | | | @serviceDescrLang | 0..1 |
| | | mpuComponent | | | 0..1 |
| | | | @mmtPackageId | | 1 |
| | | | @nextMmtPackageId | | 0..1 |
| | | routeComponent | | | 0..1 |
| | | | @sTSIDUri | | 1 |
| | | | @sTSIDDestinationIpAddress | | 0..1 |
| | | | @sTSIDDestinationUdpPort | | 1 |
| | | | @sTSIDSourceIpAddress | | 1 |
| | | | @sTSIDMajorProtocolVersion | | 0..1 |
| | | | @sTSIDMinorProtocolVersion | | 0..1 |
| | | broadbandComponent | | | 0..1 |
| | | | @fullMPDUri | | 1 |
| | | ComponentInfo | | | 1..N |
| | | | @ComponentType | | 1 |
| | | | @ComponentRole | | 1 |
| | | | @ComponentProtectedFlag | | 0..1 |
| | | | @ComponentId | | 1 |
| | | | @ComponentName | | 0..1 |

FIG. 6
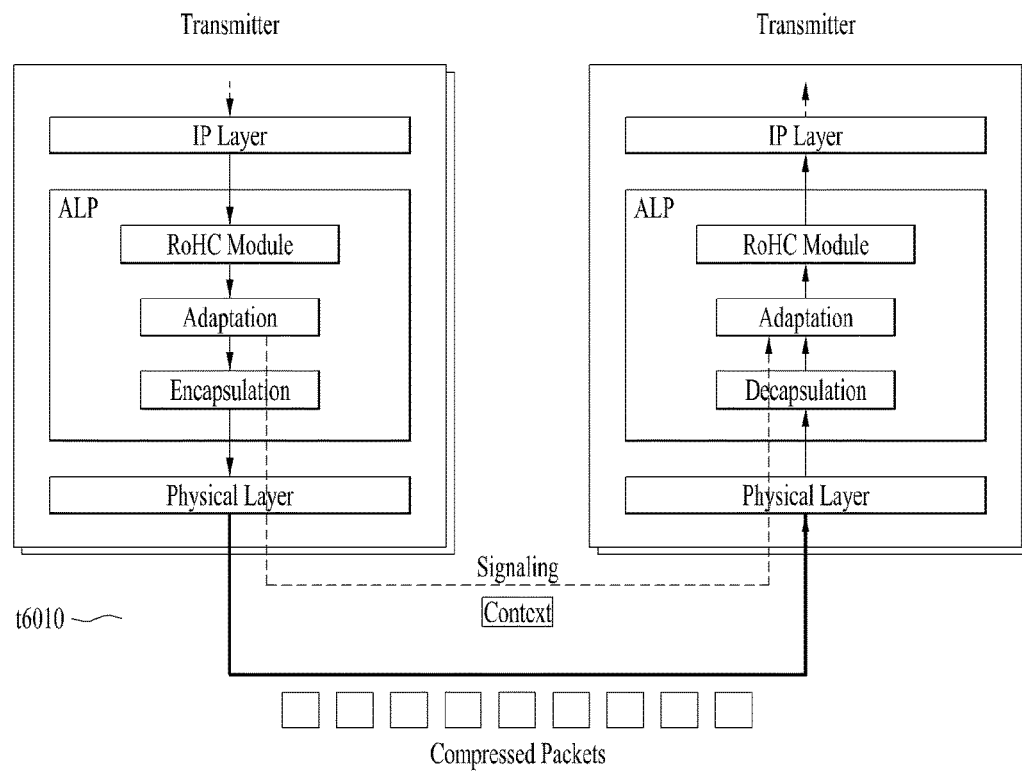
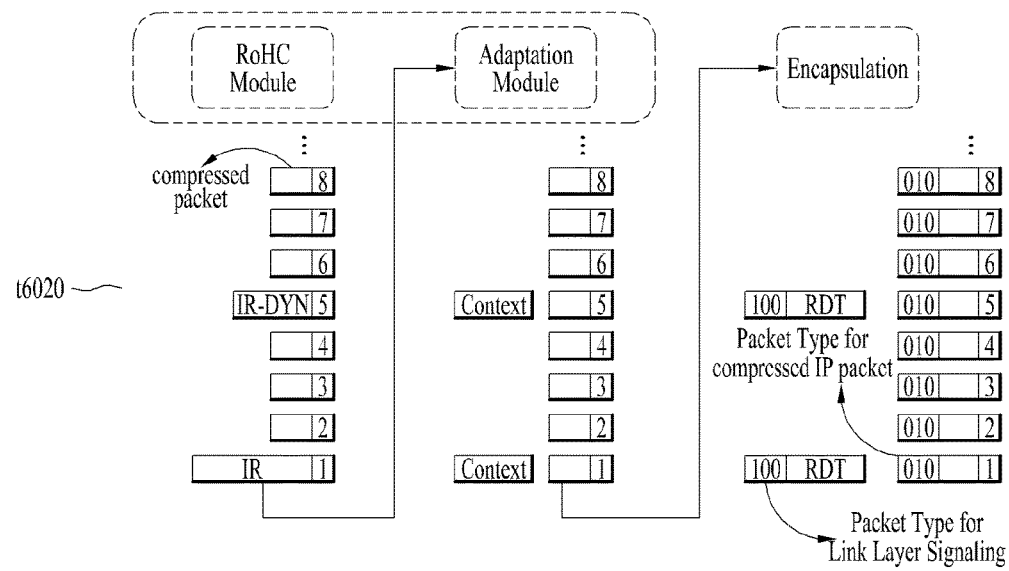

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == "1") { | | |
|          SID | 8 | uimsbf |
|       } | | |
|       if (compressed_flag == '1') { | | |
|          context_id | 8 | uimsbf |
|       } | | |
|    } | | |
| } | | |

FIG. 12

| EOTF curve type | Description |
|---|---|
| 0×00 | Linear function |
| 0×01 | Logarithmic function |
| 0×02 | Exponential function |
| 0×03 | Inverse s-curve |
| 0×04 | Piecewise non-linear curves |
| 0×05 | Look-up table |
| 0×06 ~ 0×FF | Reserved |

FIG. 13

L13010  out = gain × in + offset

L13020  out = gain × e$^{(coeff \times in)}$ + offset

L13030  out = gain × log(coeff × in) + offset

L13040  out = $\begin{cases} \text{gain1} \times \log(\text{coeff\_a1} \times \text{in}) e^{(\text{coeff\_a1} \times \text{in})} - \text{offset1} & \text{if(in < intersection)} \\ \text{gain2} \times e^{(\text{coeff\_a2} \times \text{in})} + \text{offset2} & \text{else} \end{cases}$ L13050  out = $\begin{cases} \text{gain1} \times \log(\text{coeff\_a1} \times \text{in}) - \text{offset1} & \text{if(in < intersection\_x[0])} \\ \text{gain2} \times \text{in} + \text{offset2} & \text{else if(in} \geq \text{intersection\_x[0] \& in < intersection\_x[1])} \\ \text{gain3} \times e^{(\text{coeff\_a3} \times \text{in})} + \text{offset3} & \text{else} \end{cases}$

FIG. 14

| Syntax | No. of bits | Descriptor |
|---|---|---|
| TS_program_map_section(){ | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0;i<N;i++){ | | |
|     descriptor() | | |
|   } | | |
|   for (i=0;i<N;i++){ | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i=0;i<N2;i++){ | | |
|       discriptor() | | |
|     } | | |
|   } | | |
|   CRC_32 | 32 | rpchof |
| } | | |

→ EOTF_parameter_info_descriptor()

| Syntax | No. of bits | Descriptor |
|---|---|---|
| UHD_program_info_descriptor(){ | | |
|   descriptor_tag | 8 | uimsbf |
|   descriptor_length | 8 | uimsbf |
|   UHD_service_type | 4 | uimsbf |
|   Reserved | 4 | |
| } | | |

| UHD_service_type | Usage example |
|---|---|
| 0000 | UHD1 |
| 0001 | UHD2 |
| 0010-0111 | Reserved |
| 1000-1111 | User_private |

→ UHD_service_type = 1100
(UHD1 service with EOTF information metadata)

FIG. 15

| Syntax | No. of bits | Descriptor |
|---|---|---|
| event_information_table_section(){ | | |
| table_id | 8 | 0xCB |
| section_syntax_indicator | 1 | '1' |
| private_indicator | 1 | '1' |
| reserved | 2 | '11' |
| section_length | 12 | uimsbf |
| source_id | 16 | uimsbf |
| reserved | 2 | '11' |
| version_number | 5 | uimsbf |
| current_next_indicator | 1 | '1' |
| section_number | 8 | uimsbf |
| last_section_number | 8 | uimsbf |
| protocol_version | 8 | uimsbf |
| num_events_in_section | 8 | uimsbf |
| for(j=0;j<num_events_in_section;j++){ | | |
| reserved | 2 | '11' |
| event_id | 14 | uimsbf |
| start_time | 32 | uimsbf |
| reserved | 2 | '11' |
| ETM_location | 2 | uimsbf |
| length_in_seconds | 20 | uimsbf |
| title_length | 8 | uimsbf |
| title_text() | var | |
| reserved | 4 | '1111' |
| descriptors_length | 12 | uimsbf |
| for(i=0;i<N;i++){ | | |
| discriptor() | | |
| } | | |
| } | | |
| CRC_32 | 32 | rpchof |
| } | | |

L15010

| Syntax | No. of bits | Descriptor |
|---|---|---|
| event_information_section(){ | | |
| table_id | 8 | uimsbf |
| section_syntax_indicator | 1 | bslbf |
| reserved_future_une | 1 | bslbf |
| reserved | 2 | bslbf |
| section_length | 12 | uimsbf |
| source_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| transport_stream_id | 16 | uimsbf |
| original_network_id | 16 | uimsbf |
| segment_lant_section_number | 8 | uimsbf |
| last_tabel_id | 8 | uimsbf |
| for(i=0;i<N;i++){ | | |
| event_id | 16 | uimsbf |
| start_time | 40 | bslbf |
| duration | 24 | uimsbf |
| running_status | 3 | uimsbf |
| free_CA_mode | 1 | bslbf |
| descriptors_loop_length | 12 | uimsbf |
| for(i=0;i<N;i++){ | | |
| discriptor() | | |
| } | | |
| CRC_32 | 32 | rpchof |
| } | | |

| Syntax | No.of bits | Format |
|---|---|---|
| EOTF_parameter_info_descriptor(){ | | |
|     descriptor_tag | 8 | uimsbf |
|     descriptor_length | 8 | uimsbf |
|     reserved | 4 | |
|     number_of_info | 4 | |
|     for(i=0;i<number_of_info;i++){ | | |
|         EOTF_parameter_info_metadata() | | |
|     } | | |
| } | | |

FIG. 18

| Syntax | No. of bits | Descriptor |
|---|---|---|
| EOTF_parameter_info (payloadSize) { | | |
|     EOTF_paramter_type | 3 | uimsbf |
|     EOTF_parameter_flag | 1 | uimsbf |
|     color_space_conversion_flag | 1 | uimsbf |
|     if(color_space_conversion_flag) | | |
|         color_space_type | 4 | uimsbf |
|     number_of_channels_minus1 | 2 | uimsbf |
|     for(n=0; n<number_of_channels_minus1; n++) { | | |
|         if(EOTF_parameter_flag == 1) { | | |
|             number_of_points | 8 | uimsbf |
|             for(i=0; i<number_of_inflection_points; i++) { | | |
|                 EOTF_point_x_index[i] | 8 | uimsbf |
|                 EOTF_point_y_index[i] | 8 | uimsbf |
|                 EOTF_curve_type[i] | 8 | uimsbf |
|                 EOTF_curve_coefficient_alpha[i] | 8 | uimsbf |
|                 EOTF_curve_coefficient_beta[i] | 8 | uimsbf |
|                 EOTF_curve_coefficient_gamma[i] | 8 | uimsbf |
|             } | | |
|         } | | |
|     } | | |
|     luminance_info_flag | | |
|     if(luminance_info_flag == 1) { | | |
|         EOTF_max_luminance | | |
|         EOTF_min_luminance | | |
|     } | | |
| } | | |

| color_space_type | Description |
|---|---|
| 0 | RGB |
| 1 | YCbCr BT.2020 non-CL |
| 2 | YCbCr BT.2020 CL |
| 3 | Yuv |
| 4~15 | Reserved |

FIG. 21

| | Descriptor |
|---|---|
| video_parameter_set_rbsp( ) { | |
| vps_video_parameter_set_id | u(4) |
| vps_base_layer_internal_flag | u(1) |
| vps_base_layer_available_flag | u(1) |
| vps_max_layers_minus1 | u(6) |
| vps_max_sub_layers_minus1 | u(3) |
| vps_temporal_id_nesting_flag | u(1) |
| vps_reserved_0xffff_16bits | u(16) |
| profile_tier_level( 1, vps_max_sub_layers_minus1 ) | |
| vps_sub_layer_ordering_info_present_flag | u(1) |
|    for( i = ( vps_sub_layer_ordering_info_present_flag ? 0 : vps_max_sub_layers_minus1 ); | |
|       i <= vps_max_sub_layers_minus1; i++ ) { | |
|      vps_max_dec_pic_buffering_minus1[ i ] | ue(v) |
|      vps_max_num_reorder_pics[ i ] | ue(v) |
|      vps_max_latency_increase_plus1[ i ] | ue(v) |
|    } | |
| vps_max_layer_id | u(6) |
| vps_num_layer_sets_minus1 | ue(v) |
| for( i = 1; i <= vps_num_layer_sets_minus1; i++ ) | |
|    for( j = 0; j <= vps_max_layer_id; j++ ) | |
|      layer_id_included_flag[ i ][ j ] | u(1) |
| vps_timing_info_present_flag | u(1) |
| if( vps_timing_info_present_flag ) { | |
|    vps_num_units_in_tick | u(32) |
|    vps_time_scale | u(32) |
|    vps_poc_proportional_to_timing_flag | u(1) |
|    if( vps_poc_proportional_to_timing_flag ) | |
|      vps_num_ticks_poc_diff_one_minus1 | ue(v) |
|    vps_num_hrd_parameters | ue(v) |
|    for( i = 0; i < vps_num_hrd_parameters; i++ ) { | |
|      hrd_layer_set_idx[ i ] | ue(v) |
|      if( i > 0 ) | |
|        cprms_present_flag[ i ] | ue(1) |
|      hrd_parameters( cprms_present_flag[ i ], vps_max_sub_layers_minus1 ) | |
|    } | |
| } | |
| vps_extension_flag | u(1) |
| if( vps_extension_flag ) { | |
|    vps_EOTF_parameter_info_flag | u(1) |
|    vps_extension_7bits | u(7) |
| } | |
| if(vps_EOTF_parameter_info_flag) | |
|    EOTF_parameter_info( ) | |
| if( vps_extension_7bits ) | |
|    while( more_rbsp_data( ) ) | |
|      vps_extension_data_flag | u(1) |
| rbsp_trailing_bits( ) | |
| } | |

FIG. 22

| seq_parameter_set_rbsp( ) { | Descriptor |
|---|---|
|    sps_video_parameter_set_id | u(4) |
|    sps_max_sub_layers_minus1 | u(3) |
|    ..... | |
|    vui_parameters_present_flag | u(1) |
|    if( vui_parameters_present_flag ) | |
|       vui_parameters( ) | |
| | |
|    sps_extension_present_flag | u(1) |
|    if( sps_extension_present_flag ) { | |
|       sps_range_extension_flag | u(1) |
|       sps_multilayer_extension_flag | u(1) |
|       sps_3d_extension_flag | u(1) |
|       sps_scc_extension_flag | u(1) |
|       sps_EOTF_parameter_info_flag | u(2) |
|       sps_extension_3bits | u(3) |
|    } | |
|    .... | |
|    if( sps_scc_extension_flag ) | |
|       sps_scc_extension( ) | |
|    if(sps_EOTF_parameter_info_flag) | |
|       EOTF_parameter_info( ) | |
|    if( sps_extension_3bits ) | |
|       while( more_rbsp_data( ) ) | |
|          sps_extension_data_flag | u(1) |
|    rbsp_trailing_bits( ) | |
| } | |

FIG. 23

| pic_parameter_set_rbsp( ) { | Descriptor |
|---|---|
| pps_pic_parameter_set_id | ue(v) |
| pps_seq_parameter_set_id | ue(v) |
| ...... | |
| pps_extension_present_flag | u(1) |
| if( pps_extension_present_flag ) { | |
|     pps_range_extension_flag | u(1) |
|     pps_multilayer_extension_flag | u(1) |
|     pps_3d_extension_flag | u(1) |
|     pps_scc_extension_flag | u(1) |
|       pps_EOTF_parameter_info_flag | u(1) |
|     pps_extension_3bits | u(3) |
| } | |
| ........ | |
| if( pps_scc_extension_flag ) | |
|     pps_scc_extension_flag( ) | |
| if(pps_EOTF_parameter_info_flag) | |
|     EOTF_parameter_info( ) | |
| if( pps_extension_3bits ) | |
|     while( more_rbsp_data( ) ) | |
|       pps_extension_data_flag | u(1) |
| rbsp_trailing_bits( ) | |
| } | |

| sei_payload( payloadType, payloadSize ) { | Category | Descriptor |
|---|---|---|
| ... | | |
| if( payloadType == 184 ) | | |
|   EOTF_parameter_info (payloadSize) | 5 | |

L25020

| vui_parameters( ) { | |
|---|---|
|   aspect_ratio_info_present_flag | |
|   if(aspect_ratio_into_present_flag | |
|     aspect_ration_idc | |
|     if( aspect_ratio_idc == EXTENDED_SAR ) { | |
|       sar_width | |
|       sar_height | |
|     } | |
|   } | |
|   overscan_info_present_flan | |
|   if( ocerscan_info_present_flan ) | |
|     overscan_appropriate_flan | |
|   video_signal_type_present_flag | |
|   if( video_signal_type_present_flan) { | |
|     video_formar | |
|     video_full_range_flag | |
|     colour_description_present_flag | |
|     if( colour_description_present_flan ) { | |
|       colour_primaries | |
|       transfer_characteristics | |
|       matrix_coeffs | |
|   } | |

| value | parameterized transfer function | Informative remark |
|---|---|---|
| 19 | parameterized transfer function | Table 2 or table 2-1 based application |
| 20 | parameterized transfer function (scene based adaptation) | Table 2-2 based application (or table 2, table 2-1 may be use) |
| 21..255 | Reserved | For future use by ITU-T \| ISO / IEC |

FIG. 28

| Syntax | No. of bits | Descriptor |
|---|---|---|
| EOTF_parameter_info (payloadSize) { | | |
|     EOTF_paramter_type | 3 | uimsbf |
|     EOTF_parameter_flag | 1 | uimsbf |
|     EOTF_dynamic_change_flag | 1 | uimsbf |
|     if(EOTF_dynamic_change_flag == 1) { | | |
|         total_number_of_sets | 8 | uimsbf |
|         set_number | 8 | uimsbf |
|         version_number | 8 | uimsbf |
|         sync_info_type | 8 | uimsbf |
|         sync_start | 8 | uimsbf |
|         sync_duration | 8 | uimsbf |
|     } | | |
|     transition_flag | 8 | uimsbf |
|     color_space_conversion_flag | 4 | uimsbf |
|     if(color_space_conversion_flag) | | |
|         color_space_type | 4 | uimsbf |
|     number_of_channels_minus1 | 2 | uimsbf |
|     for(n=0; n<number_of_channels_minus1; n++) { | | |
|         if(EOTF_parameter_flag == 1) { | | |
|             number_of_points | 8 | uimsbf |
|             for(i=0; i<number_of_inflection_points; i++) { | | |
|                 EOTF_point_x_index[i] | 8 | uimsbf |
|                 EOTF_point_y_index[i] | 8 | uimsbf |
|                 EOTF_curve_type[i] | 8 | uimsbf |
|                 EOTF_curve_coefficient_alpha[i] | 8 | uimsbf |
|                 EOTF_curve_coefficient_beta[i] | 8 | uimsbf |
|                 EOTF_curve_coefficient_gamma[i] | 8 | uimsbf |
|             } | | |
|         } | | |
|     } | | |
|     luminance_info_flag | 1 | uimsbf |
|     if(luminance_info_flag == 1) { | | |
|         EOTF_max_luminance | 8 | uimsbf |
|         EOTF_min_luminance | 8 | uimsbf |
|     } | | |
| } | | |

FIG. 29

| sync_info_type | Description |
|---|---|
| 0x00 | Time (ms) |
| 0x01 | Time difference (ms) |
| 0x02 | Start order (0,1,2,3,...) |
| 0x03 | POC (Picture order count) |
| 0x04 | PTS |
| 0x05 | Accumulated frame based on reference time |
| 0x06 – 0xFF | Reserved |

| EOTF_info_type | Description |
|---|---|
| 0000 | mastering display |
| 0001 | camera |
| 0010 | channel |
| 0011 | program |
| 0100 | content |
| 0101 | scene |
| 0110 | clip |
| 0111 | frame |
| 1000-1111 | Reserved for future use |

DEVICE FOR TRANSMITTING BROADCAST SIGNAL, DEVICE FOR RECEIVING BROADCAST SIGNAL, METHOD FOR TRANSMITTING BROADCAST SIGNAL, AND METHOD FOR RECEIVING BROADCAST SIGNAL

This application is a National Phase application of International Application No. PCT/KR2017/001077, filed Feb. 1, 2017, and claims the benefit of U.S. Provisional Application No. 62/289,863, filed on Feb. 1, 2016, U.S. Provisional Application No. 62/294,317, filed on Feb. 12, 2016, and U.S. Provisional Application No. 62/303,397, filed on Mar. 4, 2016, all of which are hereby incorporated by reference in their entirety for all purposes as if fully set forth herein.

TECHNICAL FIELD

The present invention relates to a broadcast signal transmission apparatus, a broadcast signal reception apparatus, and broadcast signal transmission/reception methods.

BACKGROUND ART

As analog broadcast comes to an end, various technologies for transmitting/receiving digital broadcast signals are being developed. A digital broadcast signal may include a larger amount of video/audio data than an analog broadcast signal and further include various types of supplementary data in addition to the video/audio data.

UHD broadcast aims at provision of better picture quality and immersiveness than HD broadcast to viewers through various aspects. To this end, a method of extending a dynamic range and a color gamut represented in content to a dynamic range and a color gamut which can be visually recognized by users, that is, HDR (high dynamic range) and WCG (wide color gamut), is expected to be introduced. That is, content provides enhanced contrast and color such that users who view UHD content can experience enhanced immersiveness and sense of realism. The present invention suggests a method capable of effectively reproducing brightness and colors of images according to intention of a producer when content is displayed through a display such that users can view images with enhanced picture quality.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention proposes a system capable of effectively supporting next generation broadcast services in an environment supporting next-generation hybrid broadcast using terrestrial broadcast networks and the Internet and related signaling methods as included and approximately described herein according to objects of the present invention.

Advantageous Effects

The present invention provides a method of signaling a color space to which an EOTF is applied.

The present invention provides a method of signaling a unit to which an EOTF is applied.

The present invention provides various embodiments for signaling EOTF-related information.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating a service discovery procedure according to one embodiment of the present invention;

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 12 is a diagram illustrating description of EOTF_curve_type field values according to an embodiment of the present invention;

FIG. 13 is a diagram illustrating functional formulas according to EOTF_curve_type field values according to an embodiment of the present invention;

FIG. 14 is a diagram describing a case in which EOTF parameter information is signaled through a program map table (PMT) according to an embodiment of the present invention;

FIG. 15 is a diagram describing a case in which EOTF parameter information is signaled through an event information table (EIT) according to an embodiment of the present invention;

FIG. 16 is a diagram illustrating a configuration of an EOTF_parameter_info_descriptor according to an embodiment of the present invention;

FIG. 18 is a view showing the syntax of an EOTF_parameter_info_descriptor and the description of the value of a color_space_type field according to another embodiment of the present invention;

FIG. 21 is a view showing a method of signaling EOTF parameter information according to another embodiment of the present invention;

FIG. 22 is a view showing a method of signaling EOTF parameter information according to another embodiment of the present invention;

FIG. 23 is a view showing a method of signaling EOTF parameter information according to another embodiment of the present invention;

FIG. 25 is a view showing a method of signaling EOTF parameter information according to another embodiment of the present invention;

FIG. 28 is a view showing the syntax of an EOTF_parameter_info descriptor according to another embodiment of the present invention;

FIG. 29 is a view showing the description of the value of a sync_info_type field and an EOTF_info_type field according to an embodiment of the present invention;

BEST MODE

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while accomplishing performance required for a specific purpose.

Figure 1:
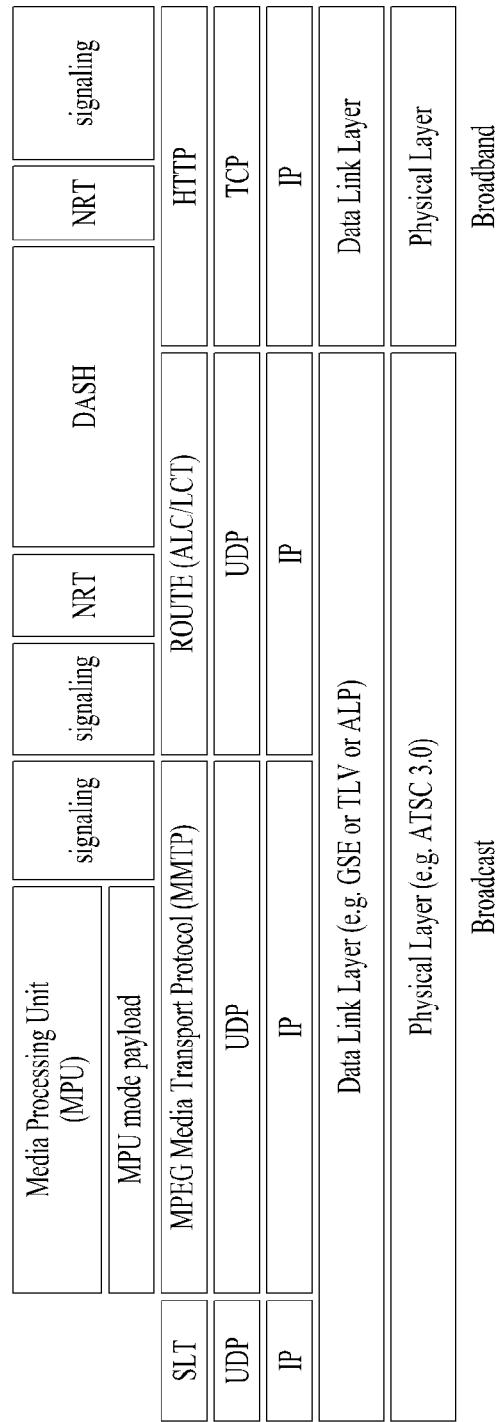
FIG. 1 is a diagram illustrating a protocol stack according to one embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer sessions may be called multicast. Information on IP streams or transport sessions transmitted through a specific PLP may be acquired through the LMT. In contrast, information on through which PLP a specific transport session is delivered may be acquired.

The LMT can be delivered through any PLP which is identified as carrying LLS. Here, a PLP through which LLS is delivered can be identified by an LLS flag of L1 detail signaling information of the physical layer. The LLS flag may be a flag field indicating whether LLS is delivered through a corresponding PLP for each PLP. Here, the L1 detail signaling information may correspond to PLS2 data which will be described below.

That is, the LMT can be delivered along with the LLS through the same PLP. Each LMT can describe mapping between PLPs and IP addresses/ports as described above. The LLS may include an SLT, as described above. An IP address/port described by the LMT may be any IP address/port related to any service described by the SLT delivered through the same PLP as that used to deliver the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments.

The signaling_type field may indicate the type of signaling information delivered by the table. The value of signaling_type field for the LMT may be set to 0x01. The signaling_type field may be omitted. The PLP_ID field may identify a PLP which is a target to be described. When a PLP loop is used, each PLP_ID field can identify each target PLP. The PLP_ID field and following fields may be included in a PLP loop. The PLP_ID field which will be mentioned below is an ID of one PLP in a PLP loop and fields which will be described below may be fields with respect to the corresponding PLP.

The num_session field may indicate the number of higher layer sessions delivered through the PLP identified by the corresponding PLP_ID field. According to the number indicated by the num_session field, information on each session may be included. This information may include a src_IP add field, a dst_IP add field, a src_UDP_port field, a dst_UDP_port field, an SID_flag field, a compressed_flag field, an SID field and/or a context_id field.

The src_IP add field, the dst_IP add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_field=1), an RDT can be present and a PLP ID field of the RDT can have the same value as the PLP_ID field related to the compressed_flag field.

The SID field may indicate the SIDs (sub stream IDs) of the link layer packets delivering the transport session. The link layer packets may include an SID having the same values as the SID field in the optional headers thereof. Accordingly, the receiver can filter link layer packets using information of the LMT and SID information of link layer packet headers without parsing all of the link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of a service can be delivered through a plurality of ROUTE sessions. In this case, the SLS can be acquired through bootstrap information of an SLT. S-TSID and MPD can be referenced through USBD of the SLS. The S-TSID can describe not only a ROUTE session through which the SLS is delivered but also transport session description information about other ROUTE sessions through which the service components are delivered. Accordingly, all the service components delivered through the multiple ROUTE sessions can be collected. This can be equally applied to a case in which service components of a service are delivered through a plurality of MMTP sessions. For reference, one service component may be simultaneously used by multiple services.

In another embodiment of the present invention, bootstrapping for an ESG service can be performed through a broadcast network or a broadband. URL information of an SLT can be used by acquiring an ESG through a broadband. A request for ESG information may be sent to the URL.

In another embodiment of the present invention, one of the service components of a service can be delivered through a broadcast network and another service component may be delivered over a broadband (hybrid). The S-TSID describes components delivered over a broadcast network such that a ROUTE client can acquire desired service components. In addition, the USBD has base pattern information and thus can describe which segments (which components) are delivered and paths through which the segments are delivered. Accordingly, a receiver can recognize segments that need to be requested from a broadband server and segments that need to be detected from broadcast streams using the USBD.

In another embodiment of the present invention, scalable coding for a service can be performed. The USBD may have all pieces of capability information necessary to render the corresponding service. For example, when a HD or UHD service is provided, the capability information of the USBD may have a value of "HD UHD". The receiver can recognize which component needs to be presented to render a UHD or HD service using the MPD.

In another embodiment of the present invention, SLS fragments delivered (USBD, S-TSID, MPD or the like) by LCT packets delivered through an LCT channel which delivers the SLS can be identified through a TOI field of the LCT packets.

In another embodiment of the present invention, application components to be used for application based enhancement/app based service can be delivered over a broadcast network or a broadband as NRT components. In addition, application signaling for application based enhancement can be performed by an AST (Application Signaling Table) delivered along with the SLS. Further, an event which is signaling for an operation to be executed by an application may be delivered in the form of an EMT (Event Message Table) along with the SLS, signaled in MPD, or in-band signaled in the form of a box in DASH representation. The AST and the EMT may be delivered over a broadband. Application based enhancement can be provided using collected application components and the aforementioned signaling information.

In another embodiment of the present invention, a CAP message may be included in the aforementioned LLS table and provided for emergency alert. Rich media content for emergency alert may also be provided. Rich media may be signaled through a CAP message. When rich media are present, the rich media can be provided as an EAS service signaled through an SLT.

In another embodiment of the present invention, linear service components can be delivered through a broadcast network according to the MMT protocol. In this case, NRT data (e.g., application component) regarding the corresponding service can be delivered through a broadcast network according to the ROUTE protocol. In addition, data regarding the corresponding service may be delivered over a broadband. The receiver can access an MMTP session through which the SLS is delivered using bootstrap information of the SLT. The USBD of the SLS according to the MMT can reference an MP table to allow the receiver to acquire linear service components formatted into MPU and delivered according to the MMT protocol. Furthermore, the USBD can further reference S-TSID to allow the receiver to acquire NRT data delivered according to the ROUTE protocol. Moreover, the USBD can further reference the MPD to provide reproduction description for data delivered over a broadband.

In another embodiment of the present invention, the receiver can deliver location URL information through which streaming components and/or file content items (files, etc.) can be acquired to a companion device thereof through a method such as web socket. An application of the companion device can acquire corresponding component data by sending a request to the URL through HTTP GET. In addition, the receiver can deliver information such as system time information and emergency alert information to the companion device.

Figure 8:
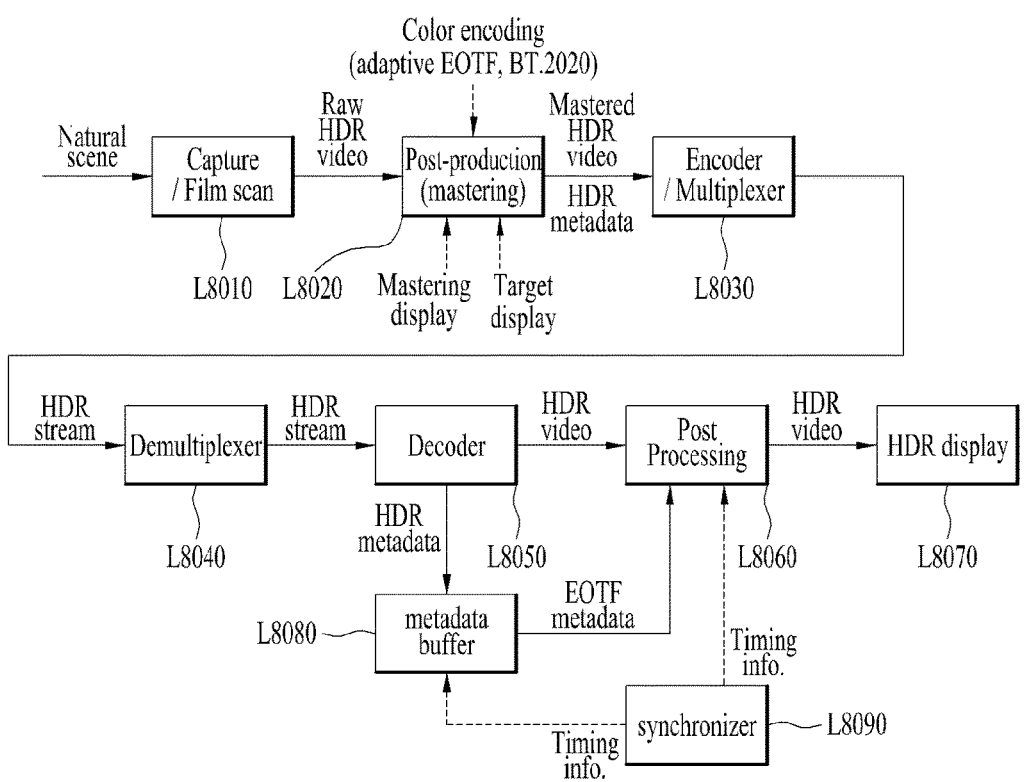
FIG. 8 is a diagram illustrating a structure of a transceiving system for adaptive EOTF based HDR broadcast services according to an embodiment of the present invention.

FIG. 8 is a diagram illustrating a structure of a transceiving system for adaptive EOTF based HDR broadcast services according to an embodiment of the present invention.

A broadcast system according to an embodiment of the present invention provides adaptive electro-optical transfer function (EOTF) based high dynamic range (HDR) broadcast services. An EOTF is a function used to convert an electronic video signal into an optical video signal at a receiver for video decoding. An OETF is a function used to convert an optical video signal into an electronic video signal at a transmitter for video encoding. HDR content refers to content having a wide dynamic range and standard dynamic range (SDR) content or low dynamic range (LDR) content refers to content having a narrow dynamic range. The dynamic range of content represents a range of luminance of content.

When HDR content which can represent a wide range of luminance is provided, the broadcast system according to an embodiment of the present invention can consider a characteristic difference between the HDR content and a display using an adaptive EOTF and thus can provide optimized picture quality to viewers.

UHD broadcast can provide differentiation from conventional broadcast and a high degree of presence by representing luminance which cannot be represented in conventional content. Introduction of HDR increases a dynamic range of images and thus a characteristic difference between scenes of content further increases. The broadcast system according to an embodiment of the present invention provides information for effectively presenting characteristics of scenes on a display and a receiver provides video effects on the basis of the information, and thus viewers can view images through a method adapted for the intention of a producer.

A transmitter according to an embodiment of the present invention can deliver information about an HDR EOTF which varies according to content or a scene to the receiver. Specifically, the transmitter can deliver information about a unit in which the HDR EOTF varies and/or adaptive information in consideration of characteristics of content and displays.

The broadcast system according to an embodiment of the present invention can provide an environment in which HDR video with enhanced picture quality through metadata is viewed. The metadata transmitted according to an embodiment of the present invention signals parameter information about the adaptive EOTF and the receiver can improve picture quality or a viewing environment using the metadata by applying different EOTFs depending on content/scenes and target displays.

The figure illustrates the structure of the broadcast system according to an embodiment of the present invention. The broadcast system according to an embodiment of the present invention includes a capture/film scan unit L8010, a post-production (mastering) unit L8020, an encoder/multiplexer L8030, a demultiplexer L8040, a decoder L8050, a post-processing unit L8060, an HDR display L8070, a metadata buffer L8080 and/or a synchronizer L8090. The capture/film scan unit L8010 captures and scans natural scenes to generate raw HDR video. The post-production (mastering) unit L8020 masters the HDR video to generate mastered HDR video and HDR metadata for signaling characteristics of the mastered HDR video. To master the HDR video color encoding information (adaptive EOTF, BT.2020), information about a mastering display, information about a target display, and the like may be used. The encoder/multiplexer L8030 encodes the mastered HDR video to generate HDR streams and performs multiplexing with other streams to generate broadcast streams. The demultiplexer L8040 receives and demultiplexes the broadcast streams to generate HDR streams (HDR video streams). The decoder L8050 decodes the HDR streams to output the HDR video and the HDR metadata. The metadata buffer L8080 receives the HDR metadata and delivers EOTF metadata among the HDR metadata to the post-processing unit. The post-processing unit L8060 post-processes the HDR video delivered from the decoder using the EOTF metadata and/or timing information. The HDR display L8070 displays the post-processed HDR video.

Figure 9:
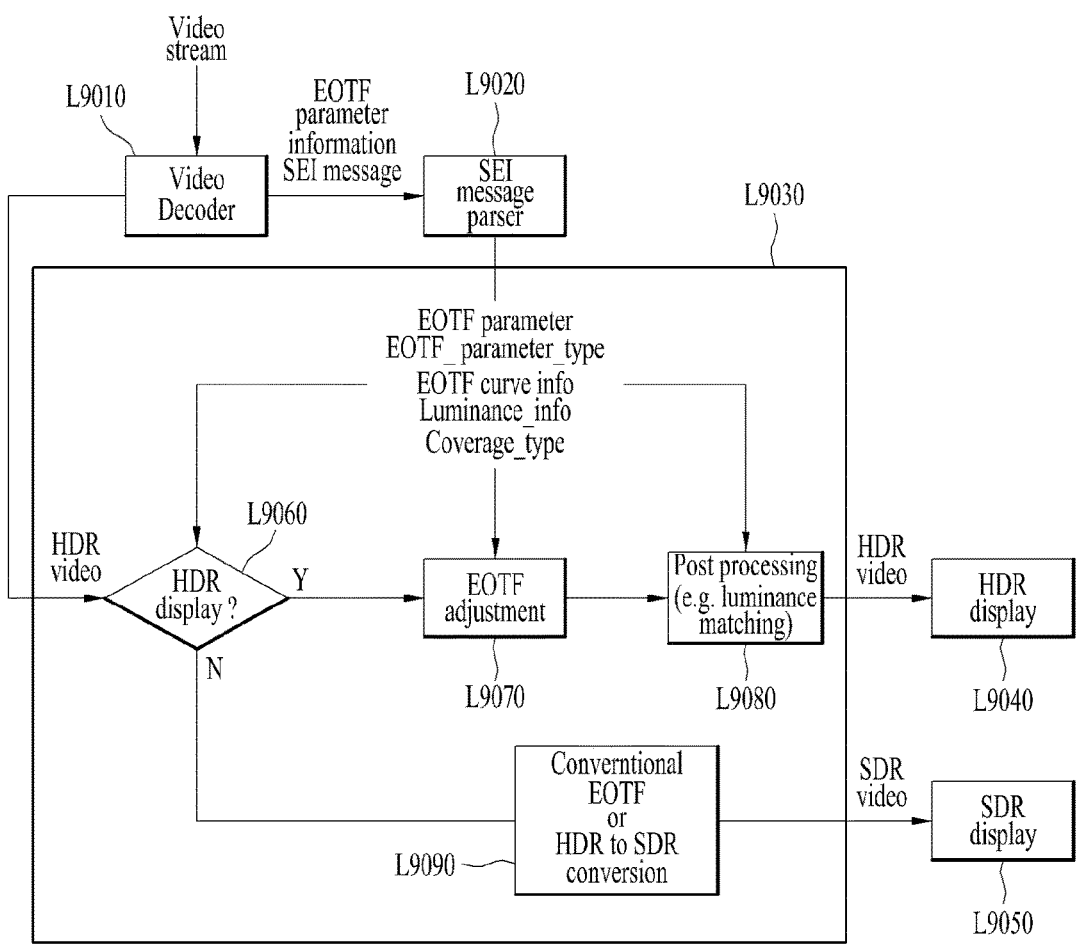
FIG. 9 is a diagram illustrating a structure of a receiver according to an embodiment of the present invention.

FIG. 9 is a diagram illustrating a structure of a receiver according to an embodiment of the present invention.

In the specification, description is based on receiver operation to which the present invention is applied. However, details of signaling information which causes the receiver operation may be applied to a transmitter and the signaling information may also be applied to a production procedure and/or a mastering procedure.

The receiver according to an embodiment of the present invention receives a video stream, extracts an SEI message from the video stream and stores the SEI message in a separate buffer. The receiver determines the performance thereof, appropriately configures an EOTF applied to video using an EOTF parameter and displays final video. In the specification, EOTF has the same meaning as OETF.

The receiver according to an embodiment of the present invention includes a video decoder L9010, an SEI message parser L9020, a post-processing unit L9030, an HDR display and/or an SDR display. The first post-processing unit L9030 includes an HDR display determination unit L9060, an EOTF adjustment unit L9070, a second post-processing unit L9080 and/or a conversion unit (conventional EOTF or HDR to SDR conversion) L9090. The first post-processing unit L9030 is the same as the post-processing unit described above in the preceding figure.

The receiver according to an embodiment of the present invention receives and decodes a video stream and acquires EOTF parameter information (EOTF_parameter_info( )). The video decoder L9010 decodes the video stream and delivers metadata (SEI message) acquired from the video stream to the metadata parser (SEI message parser) L9020. The SEI message parser L9020. The SEI message parser L9020 analyzes the metadata and then stores the metadata in a memory (buffer). The EOTF parameter information includes EOTF_parameter_type, EOTF parameters, luminance_information, etc.

The receiver according to an embodiment of the present invention determines whether the display thereof supports HDR and configures an EOTF. The HDR display determination unit L9060 determines whether the display of the receiver supports HDR. Further, the HDR display determination unit L9060 determines whether content received by the receiver can be presented on the basis of the EOTF parameter information, information about the content and/or information about a mastering display. When the HDR display determination unit L9060 determines that the receiver is not suited to present the content, the receiver can be determined to be an SDR display or a display having capabilities between SDR and HDR.

According to an embodiment of the present invention, when the HDR display determination unit L9060 determines that the display of the receiver is not suitable to present the received content (when the display is an SDR display or a display having capabilities similar to SDR), the receiver does not present the content or converts HDR content into SDR content for reproduction. According to another embodiment of the present invention, when the EOTF applied to the HDR content is compatible with the EOTF used for the SDR content, the HDR content can be presented through the SDR display without being subjected to an additional conversion procedure. In this case, the EOTF compatible with the EOTF used for the SDR content may have values such as transfer_characteristics of VUI=1, 6, 14, 15. In this case, additional processing for signaling analysis is not needed.

According to an embodiment of the present invention, when the HDR display determination unit L9060 determines that the display of the receiver is suitable to present the received content, the (HDR display) EOTF adjustment unit L9070 can adjust the EOTF used to encode the HDR content using the EOTF parameter information. After the adjusted EOTF is applied, the second post-processing unit L9080 may perform tone mapping of a dynamic range used for the content using EOTF_luminance_max/min information included in the EOTF parameter information. The HDR video post-processed by the second post-processing unit L9080 can be displayed through an HDR display.

According to an embodiment of the present invention, EOTFs having different variables can be used depending on display luminances of the receiver and/or luminances of content. For example, it is possible to efficiently maintain low or normal luminance and efficiently suppress high luminance by using an EOTF having a variable a for content having maximum luminance of 1,000 nit and using an EOTF having a different EOTF having a variable a' when the maximum luminance increases to 5,000 nit. Here, information related to the above-described embodiments can be delivered through the EOTF parameter information according to an embodiment of the present invention, and luminance to which a corresponding EOTF is applied can be provided using luminance_information.

According to an embodiment, absolute luminance information can be delivered using luminance_information for an EOTF which represents relative luminance. For example, information about absolute luminance may be needed in a process of post-processing relative luminance based content. In this case, the necessary information can be delivered through luminance_information according to an embodiment of the present invention.

Figure 10:
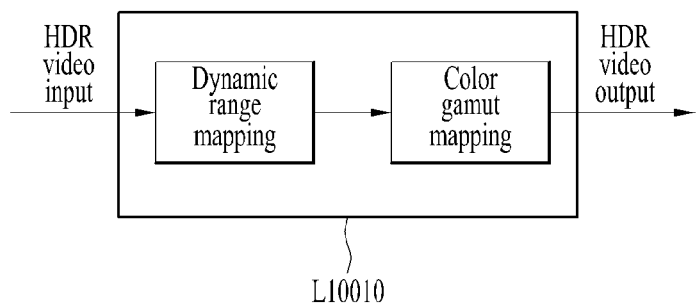
FIG. 10 is a diagram illustrating an operation performed by a second post-processing unit according to an embodiment of the present invention.

FIG. 10 is a diagram illustrating the operation of a second post-processing unit according to an embodiment of the present invention.

The second post-processing unit L10010 according to an embodiment of the present invention is the same as the second post-processing unit illustrated in the preceding figure. The second post-processing unit L10010 receives HDR video to which an adjusted EOTF has been applied and performs dynamic range mapping and color gamut mapping.

Figure 11:
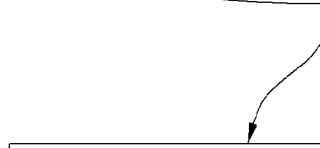
FIG. 11 is a diagram illustrating a configuration of an EOTF_parameter_info SEI (supplemental enhancement information) message according to an embodiment of the present invention.

FIG. 11 is a diagram illustrating a configuration of an EOTF_parameter_info SEI (supplemental enhancement information) message according to an embodiment of the present invention.

The broadcast system according to an embodiment of the present invention can deliver information about presence or absence of an EOTF parameter to a receiver through an SEI message of video, or a PMT or EIT which are system information.

The broadcast system according to an embodiment of the present invention can define an EOTF type through a VUI (video usability information) message and deliver supplementary information through an SEI message and/or system information.

The broadcast system according to an embodiment of the present invention can deliver information indicating an HDR EOTF using VUI, an SEI message and/or system information for compatibility with a system having a previous EOTF.

According to an embodiment of the present invention, the EOTF_parameter_info SEI message may have a payload type value of 52, and a payload includes EOTF parameter information (EOTF_parameter_info).

The EOTF parameter information according to an embodiment of the present invention includes an EOTF_parameter_type, an EOTF_parameter_flag, a number_of_points, an EOTF_point_x_index[i], an EOTF_curve_type[i], an EOTF_curve_coefficient_alpha[i], an EOTF_curve coefficient_beta[i], an EOTF_curve_coefficient_gamma[i], a luminance_info_flag, an EOTF_max_luminance and/or an EOTF_min_luminance.

The EOTF_parameter type indicates the type of an EOTF used for video encoding. According to an embodiment of the present invention, VUI signal EOTFs belonging to a specific category (e.g., a gamma function EOTF and a parametric EOTF similar thereto belong to the same category) and this field (EOTF_parameter_type=parametric_EOTF_type) can identify the EOTFs in the specific category. According to another embodiment of the present invention, an EOTF type identified by this field and an EOTF type identified by VUI may be included in categories at the same level. For example, this field (parametric_EOTF_type) can be set to 1 in order to indicate an EOTF in consideration of backward compatibility in which inflection points vary according to luminance of content.

The EOTF_parameter_flag indicates whether a specific parameter for representing an EOTF exists. This field indicates presence of the parameter for the EOTF when set to 1.

The number_of_points indicates the number of inflection points for identifying luminance sections when the EOTF indicated by the EOTF_parameter_type has different characteristics for luminance sections.

The EOTF_point_x_index and the EOTF_point_y_index indicate a position of an inflection point of an EOTF. Here, the EOTF_point_x_index may indicate a normalized digital value and the EOTF_point_y_index may indicate absolute luminance or normalized relative luminance.

The EOTF_curve_type indicates a type of a curve used in each luminance section. For example, this field can indicate a linear function when set to 0x00, a logarithmic function when set to 0x01, an exponential function when set to 0x02, an inverse s-curve when set to 0x03, piecewise non-linear curves when set to 0x04, a look-up table when set to 0x05, and reserved values when set to 0x06 to 0xFF.

The EOTF_curve_coefficient_alpha, the EOTF_curve_coefficient_beta and the EOTF_curve_coefficient_gamma can additionally deliver coefficient information according to EOTF_curve_type. The number of coefficients is determined depending on EOTF_curve_type, and coefficients other than alpha, beta and gamma indicated by these fields may be added as necessary. According to an embodiment of the present invention, when an LUT is delivered as an EOTF type, an output value (out_value) corresponding to an input value (in_value) instead of a coefficient can be signaled. When the broadcast system according to an embodiment of the present invention includes all luminance values within a mapping range, the broadcast system may not transmit an input value (in_value) of the LUT and may signal only a difference between an output value (out_value) and a luminance value instead of signaling the output value.

The luminance_info_flag indicates whether information about a luminance range related to an EOTF exists. This field indicates presence of information about the luminance range related to the EOTF when set to 1.

EOTF_max_luminance and EOTF_min_luminance indicate maximum luminance and minimum luminance matched to an EOTF. These fields may have values in the range of 0 to 10,000. Here, a value of the EOTF_max_luminance may be greater than a value of the EOTF_min_luminance. According to an embodiment of the present invention, since even an absolute luminance based EOTF does use all code values, only a luminance range within which values actually exist can be signaled. For example, when an EOTF defined in SMPTE ST 2084 is used and only a graph corresponding to a luminance range of an image is used, the EOTF_max_luminance and EOTF_min_luminance fields can be used. In this case, additional EOTF related signaling may be needed. In the case of a relative luminance based EOTF, these fields indicate information about an actual luminance range considered in content. The receiver can replace relative luminance of content by absolute luminance using the values of these fields and display the content.

According to an embodiment of the present invention, the EOTF parameter information can be varied with time. In this case, a luminance range to which a corresponding EOTF is applied, start time, end time, information indicating whether the EOTF is changed and/or information about a parameter to be changed can be signaled.

FIG. 12 is a diagram illustrating description of values of the EOTF_curve_type field according to an embodiment of the present invention.

While this figure illustrates values of the EOTF_curve_type field according to an embodiment of the present invention, the values of the EOTF_curve_type field have been described in detail in the preceding figure.

FIG. 13 is a diagram illustrating functional formulas of a curve according to values of the EOTF_curve_type field according to an embodiment of the present invention.

In this figure, L13010, L13020, L13030, L13040 and L13050 respectively represent functional formulas of a linear function, a logarithmic function, an exponential function, an inverse S-curve and piecewise non-linear curves.

FIG. 14 is a diagram illustrating a case in which EOTF parameter information according to an embodiment of the present invention is signaled through a PMT (program map table).

The broadcast system according to an embodiment of the present invention can signal EOTF parameter information using a PMT and/or an EIT (event information table) of a system level as well as an SEI message and further signal that a corresponding service is a UHD service using the EOTF parameter information.

The EOTF parameter information according to an embodiment of the present invention has a descriptor form (EOTF_parameter_info_descriptor) and may be included in a descriptor of a stream level of a PMT.

A UHD_program_info_descriptor according to an embodiment of the present invention may be included in a descriptor of a program level of a PMT. The UHD_program_info_descriptor includes descriptor_tag, descriptor_ length and/or UHD_service_type fields. The descriptor_tag indicates that the descriptor is a UHD_program_info_descriptor. The descriptor_length indicates the length of the descriptor. The UHD_service_type indicates the type of the service. The UHD_service_type indicates UHD1 when set to 0000, UHD2 when set to 0001, reserved values when set to 0010 to 0111, and user private when set to 1000 to 1111. The UHD_service_type according to an embodiment of the present invention provides information about types of UHD services (e.g., UHD service types designated by a user, such as UHD1 (4K), UHD2 (8K) and types classified according to definitions). Accordingly, the broadcast system according to an embodiment of the present invention can provide various UHD services. The broadcast system according to an embodiment of the present invention can set the UHD_service_type to 1100 (UHD1 service with EOTF parameter information (=EOTF information metadata), an example of 4K) to indicate that HDR video information based on an adaptive EOTF is provided.

A PMT according to an embodiment of the present invention includes a table_id field, a section_syntax_indicator field, a section_length field, a program_number field, a version_number field, a current_next_indicator field, a section_number field, a last_section number field, a PCR_PID field, a program_info_length field, a descriptor( ), a stream_type field, an elementary_PID field, an ES_info_length field, a descriptor ( ) and/or a CRC_32 field. The table_id field identifies a table type. The table_id field can indicate that the corresponding table section constitutes the PMT. The section_syntax_indicator field indicates the format of the table section following this field. This field indicates that the table section has a short format when set to 0 and the table section has a normal long format when set to 1. The section_length field indicates the length of the table section. The section_length field indicates a length from the end of this field to the end of the corresponding table section and thus the actual length of the table section can be a value corresponding to the value indicated by the section_length field plus 3 bytes. The program number field identifies each program service or virtual channel present in a transport stream. The version_number field indicates a version number of a private table section. The receiver can find the latest one of table sections stored in a memory using the current_next_indicator field which will be described below. The current_next_indicator field indicates that the currently transmitted table is valid when set to 1 and indicates that the table is not currently valid but will be valid later when set to 0. The section_number field indicates the number of the corresponding section in the corresponding table. The last_section_number field indicates the number of the last section among sections constituting the corresponding table. The PCR_PID field indicates a packet ID corresponding to a packet in which a PCR (Program Clock Reference) for a program service exists. The program_info_length field indicates the length of a descriptor which represents the following program information (program_info). The descriptor( ) refers to a descriptor which represents information about a program corresponding to the corresponding table section. According to an embodiment of the present invention, the descriptor can include a UHD_program_info_descriptor( ) which identifies a UHD service type. The stream_type field indicates the type of each unit stream constituting a program described by the corresponding table. The elementary_PID field indicates a packet ID of each unit stream constituting the program described by the corresponding table. The ES_info_length field indicates the length of a descriptor which represents information (ES_info) about each unit stream following the ES_info length field. The descriptor( ) refers to a descriptor which represents information about one unit stream from among unit streams constituting the program described by the corresponding table. The CRC_32 field indicates a CRC value used to check whether data included in the corresponding table section has an error. The PMT according to an embodiment of the present invention can be transmitted in band through MPEG-TS and PSI information including the PMT can be transmitted in xml through IP.

FIG. 15 is a diagram illustrating a case in which the EOTF parameter information according to an embodiment of the present invention is signaled through an EIT (event information table).

The EOTF parameter information according to an embodiment of the present invention can be included in a descriptor of an event level of the EIT in the form of a descriptor (EOTF_parameter_info_descriptor). Furthermore, the UHD_program_info_descriptor described above with reference to the preceding figure can be included in a descriptor of the event level of the EIT.

A receiver according to an embodiment of the present invention can be aware of delivery of the EOTF parameter information by checking that the UHD_service_type of the EIT has a value of 1100 (UHD1 service with EOTF parameter information (=EOTF information metadata), an example of 4K).

A receiver according to another embodiment of the present invention can be aware of delivery of the EOTF parameter information by checking presence or absence of the EOTF_parameter_info_descriptor when the UHD_service_type of the EIT has a value of 0000 (UHD1 service).

A content provider according to an embodiment of the present invention can determine whether an adaptive EOTF can be used in a display of a receiver using the EOTF_parameter_info_descriptor.

The receiver according to an embodiment of the present invention can determine whether EOTF parameter information is used for content which is currently presented or will be presented in the future in advance using the EOTF_parameter_info_descriptor and can perform setting for situations such as reserved recording in advance.

An ATSC_EIT L15010 according to an embodiment of the present invention includes a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start_time field, a duration field, a running_status field, a free_CA_mode field, a descriptors_loop_length field, a descriptor( ) and/or a CRC_32 field. The table_id field identifies a table type. The table_id field can indicate that the corresponding table section constitutes the EIT. The section_syntax_indicator field indicates the format of the table section following this field. This field indicates that the table section has a short format when set to 0 and the table section has a normal long format when set to 1. The section length field indicates the length of the table section. The section_length field indicates a length from the end of this field to the end of the corresponding table section. The service_id field identifies each service present in a transport stream. The service_id field may have the same function as the program_number field of the PMT. The version_number field indicates a version number of a private table section. The receiver can find the latest one of table sections stored in a memory using the current_next_indicator field which will be described below. The current_next_indicator field indicates that the currently transmitted table is valid when set to 1 and indicates that the table is not currently valid but will be valid later when set to 0. The section number field indicates the number of the corresponding section in the corresponding table. The last_section number field indicates the number of the last section among sections constituting the corresponding table. The transport_stream_id field identifies a transport stream (TS) to be described in the corresponding table. The original_network_id field identifies the initial broadcaster which has transmitted a service or an event described in the corresponding table. The segment_last_section_number field indicates the last section number of a corresponding segment when a sub-table is present. When the sub-table is not segmented, the value indicated by this field can be the same as the value indicated by the last_section_number field. The last_table_id field indicates the last used table_id. The event_id field identifies each event and has a unique value in one service. The start_time field indicates a start time of a corresponding event. The duration field indicates a duration of the corresponding event. For example, in the case of a program which continues for one hour and 45 minutes and 30 seconds, the duration field can indicate 0x014530. The running_status field indicates a status of the corresponding event. The free_CA_mode field indicates that component streams constituting service are not scrambled when set to 0 and indicates that access to one or more streams is controlled by a CA system when set to 1. The CA (Conditional Access) system provides a function of encoding broadcast content and a function of permitting only a contractor to decode and view broadcast content in order to limit users who watch broadcast to contractors. The descriptor_loop_length field indicates a value corresponding to the sum of lengths of descriptors following this field. The descriptor( ) refers to a descriptor described for each event. According to an embodiment of the present invention, the descriptor can include a UHD_program_info_descriptor( ) and/or an EOTF_parameter_info descriptor which indicate a UHD service type. The CRC_32 field indicates a CRC value used to check whether data included in the corresponding table section has an error.

A DVB SI-EIT L15020 according to an embodiment of the present invention may include fields included in the ATSC_EIT L15010, a service_id field, a transport_stream_id field, an original_network_id field, a segment_last_section_number field, a last_table_id field, a duration field, a running_status field, a free_CA_mode field, a descriptors_loop_length field and/or a descriptor( ). The service_id field indicates the ID of a service related to the corresponding table. The transport_stream_id field indicates the ID of a transport stream in which the corresponding table is transmitted. The original_network_id field indicates the ID of a network through which the corresponding table is transmitted. The segment_last_section_number field indicates the last section number of the corresponding segment. The last_table_id field indicates the ID of the last table. The duration field indicates a duration of a corresponding event. The running_status field indicates a status of the corresponding event. The free_CA_mode field indicates whether the corresponding event has been encoded. The descriptors_loop_length field indicates the length of a descriptor loop of an event level. The descriptor( ) refers to a descriptor described for each event. According to an embodiment of the present invention, the descriptor may include a UHD_program_info_descriptor( ) and/or an EOTF_parameter_info_descriptor which indicate a UHD service type.

FIG. 16 is a diagram illustrating a configuration of an EOTF_parameter_info_descriptor according to an embodiment of the present invention.

According to an embodiment of the present invention, a plurality of EOTF parameter information may be present per event. That is, EOTF parameter information is not consistently applied to content and can be changed with time or according to presence or absence of embedded content. Furthermore, various EOTF modes intended by a producer for one piece of content may be supported. Here, according to an embodiment of the present invention, it is necessary to determine whether a display of a receiver can accept such EOTF modes, and information about each EOTF mode can be provided through EOTF parameter information.

The EOTF_parameter_info_descriptor according to an embodiment of the present invention may include a descriptor_tag field, a descriptor_length field, a number_of_info field and/or EOTF_parameter_info_metadata (=EOTF parameter information). The descriptor_tag field indicates that the corresponding descriptor includes EOTF parameter information. The descriptor_length field indicates the length of the descriptor. The number_of_info field indicates the number of pieces of EOTF parameter information provided by a producer. The EOTF_parameter_info_metadata indicates EOTF parameter information which has been described above in detail.

Figure 17:
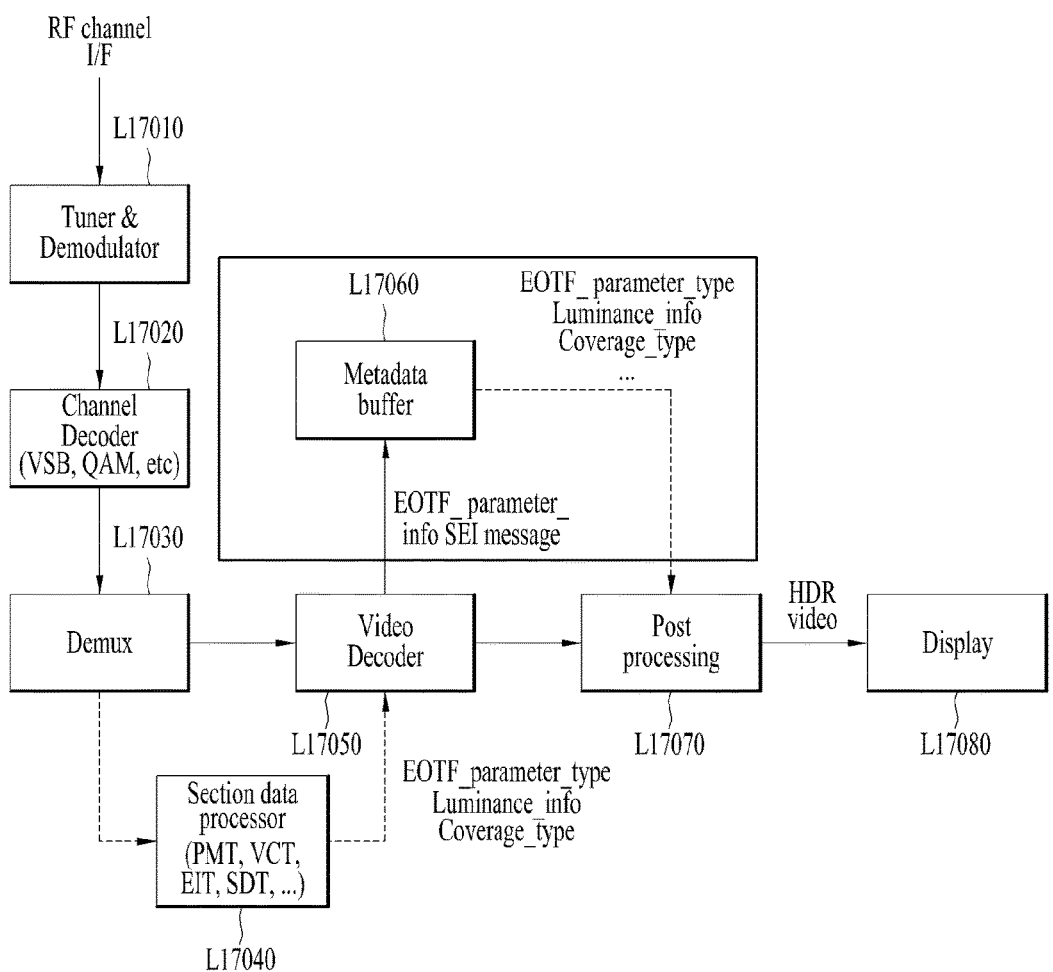
FIG. 17 is a diagram illustrating a structure of a receiver according to an embodiment of the present invention.

FIG. 17 is a diagram illustrating a structure of a receiver according to an embodiment of the present invention.

The receiver according to an embodiment of the present invention can analyze HDR video information and/or EOTF parameter information and apply the same to HDR video when the information is delivered.

Specifically, the receiver checks whether there are services or media which need to be additionally received in order to constitute the original UHDTV broadcast using the UHD_program_info_descriptor of a received PMT. The receiver according an embodiment of the present invention can recognize that there is supplementary information (EOTF parameter information) delivered through an SEI message when the UHD_service_type in the UHD_program_info_descriptor of the PMT is 1100. A receiver according to another embodiment of the present invention can recognize that there is video related supplementary information (EOTF parameter information) delivered through an SEI message when the UHD_service_type in the UHD_program_info_descriptor of the PMT is 0000 (8K is 0001). When the PMT and/or an EIT include the EOTF parameter information as well as the UHD_program_info_descriptor, the receiver can recognize presence of the EOTF parameter information by receiving the PMT and/or the EIT.

The receiver according to an embodiment of the present invention detects information about an EOTF through the EOTF_parameter_info SEI message, the EOTF_parameter_info_descriptor of the PMT and/or the EOTF_parameter_info_descriptor of the EIT. An SDR receiver presents received video on the basis of legacy EOTF information delivered through VUI. An HDR receiver acquires EOTF parameter information through the EOTF_parameter_info SEI message and/or the EOTF_parameter_info_descriptor. Specifically, the HDR receiver can recognize an EOTF type used when content is encoded or detailed classification with respect to a specific EOTF through the EOTF_parameter_type and apply an EOTF identified by the EOTF_point_x_index, the EOTF_point_y_index, the EOTF_curve_type and the EOTF_curve_coefficient_alpha which are parameters for identifying an EOTF to the content. Furthermore, the HDR receiver can recognize the dynamic range of the EOTF identified by the EOTF_parameter_type through the EOTF_max_luminance and the EOTF_min_luminance.

The receiver according to an embodiment of the present invention can apply the EOTF to a decoded image on the basis of the aforementioned EOTF parameter information to generate a linear dynamic range of the image and then post-process the image through a picture quality enhancement unit (=post-processing unit). The picture quality enhancement unit according to an embodiment of the present invention can recognize the dynamic range of the EOTF through the EOTF_max_luminance and the EOTF_min_luminance and use the same in a post-processing procedure.

The receiver according to an embodiment of the present invention may include a reception unit (tuner) L17010, a demodulator L17010, a channel decoder L17020, a demultiplexer L17030, a signaling information processor (section data processor) L17040, a video decoder L17050, a metadata buffer L17060, a post-processing unit L17070 and/or a display L17080. The reception unit can receive a broadcast signal including EOTF parameter information and UHD content. The demodulator can demodulate the received broadcast signal. The channel decoder can channel-decode the demodulated broadcast signal. The demultiplexer can extract signaling information including EOTF parameter information, video data and audio data from the broadcast signal. The signaling information processor can process section data such as a PMT, a VCT, an EIT and an SDT in the received signaling information. The video decoder can decode a received video stream. Here, the video decoder can decode the video stream using information included in the HDR_info_descriptor (including HDR related information), the EOTF_parameter_info_descriptor and/or the UHD_program_info_descriptor( ) included in the PMT and the EIT extracted by the signaling information processor. The metadata buffer can store an EOTF_parameter_info SEI message delivered through the video stream and/or EOTF parameter information included in the EOTF_parameter_info_descriptor delivered through the system information. The post-processing unit can process luminance of content using the EOTF parameter information delivered from the metadata buffer. The display can display the video processed by the post-processing unit. In this figure, the post-processing unit may be the same as the aforementioned first post-processing unit.

FIG. 18 is a view showing the syntax of an EOTF_parameter_info descriptor and the description of the value of a color_space_type field according to another embodiment of the present invention.

A broadcasting system according to another embodiment of the present invention may signal a color space to which an EOTF is applied, and may further signal an EOTF that is applied for each channel of the color space.

An EOTF according to an embodiment of the present invention is a function indicating the relationship between nonlinear color values provided to a display device and linear color values generated by the display device. Here, the nonlinear color values indicate natural colors, and the linear color values indicate values converted to transmit a natural image.

In this specification, an EOTF is illustrated and used as an example of a conversion function that converts a linear signal of an image to a nonlinear signal. Alternatively, all embodiments of the present invention may be applied to conversion functions other than an EOTF.

An EOTF_parameter_info descriptor according to another embodiment of the present invention may further include a color_space_conversion_flag field, a color_space_type field, and/or a number_of_channels_minus1 field.

The color_space_conversion_flag field indicates whether the conversion of a color space is necessary in order to apply an EOTF. In the case in which the value of this field is 1, this indicates that the conversion of a color space is necessary in order to apply an EOTF. In the case in which the value of this field is 0, this indicates that the conversion of a color space is not necessary and that an EOTF is applicable in the current color space.

The color_space_type field indicates the type of a color space to which an EOTF is applied. This field is effective in the case in which the value of the color_space_conversion_flag field is 1. In the case in which the value of this field is 0, this indicates an RGB color space. In the case in which the value of this field is 1, this indicates YCbCr BT.2020 non-CL. In the case in which the value of this field is 2, this indicates YCbCr BT.2020 CL. In the case in which the value of this field is 3, this indicates Yuv.

The number_of_channels_minus1 field indicates the number of channels to which an EOTF is applied in the color space. The value obtained by adding 1 to the value of this field indicates the number of all channels to which an EOTF is applied in the color space. In an embodiment of the present invention, Red, Green, or Blue corresponds to each channel in an RGB color space, and Y, Cb, or Cr corresponds to each channel in a YCbCr color space.

Information described by an EOTF_parameter_info descriptor according to an embodiment of the present invention may also be applied to an additional conversion function that is further applied while an EOTF that has already been applied is maintained, in addition to an EOTF. In this case, the additional conversion function may be added to an existing EOTF in order to achieve change for a specific use.

A broadcasting system according to another embodiment of the present invention may signal information included in an EOTF_parameter_info descriptor according to an embodiment of the present invention using the signaling method described with reference to the previous drawings.

In an embodiment of the present invention, the entire EOTF_parameter_info descriptor may be transmitted, or a script of the descriptor or a portion thereof may be transmitted.

Figure 19:
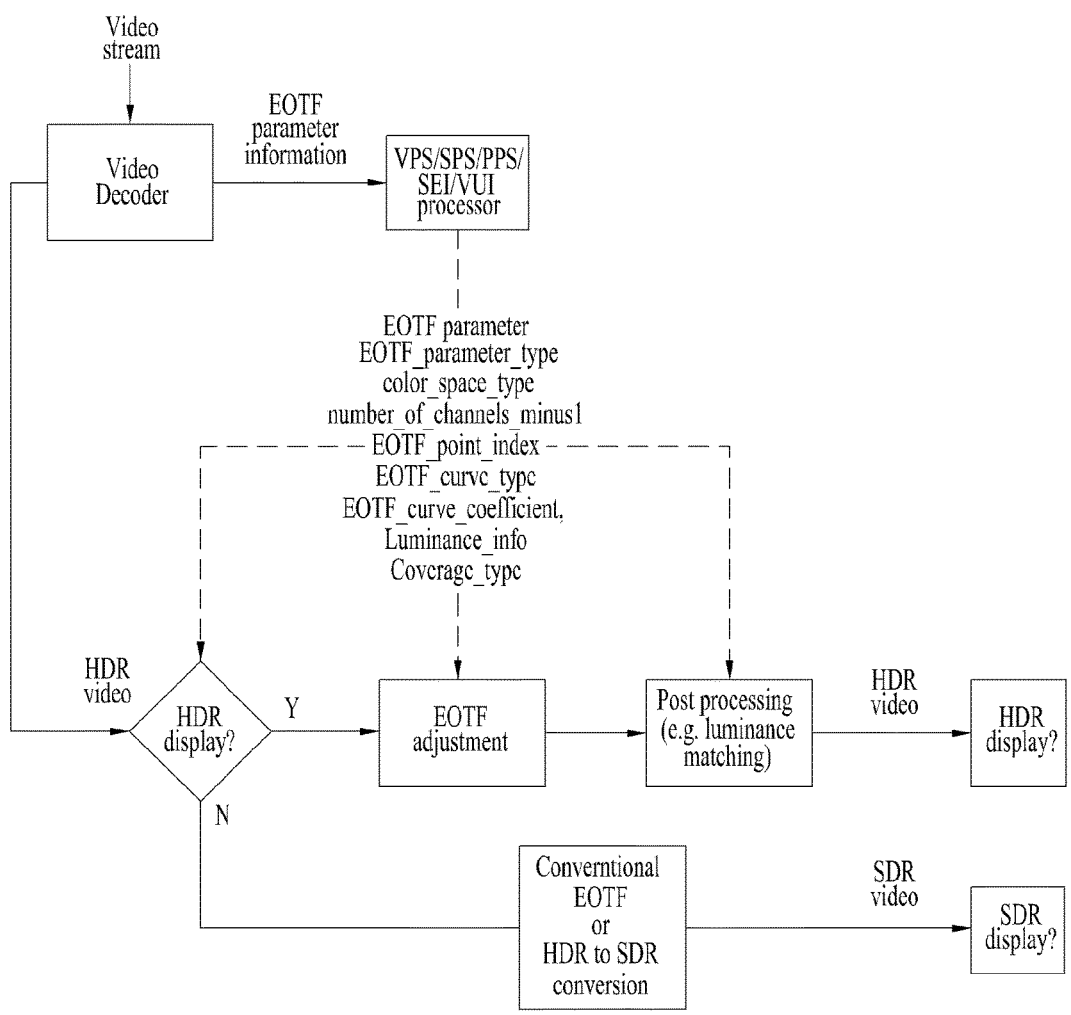
FIG. 19 is a view showing the structure of a receiver according to another embodiment of the present invention.

FIG. 19 is a view showing the structure of a receiver according to another embodiment of the present invention.

A receiver according to another embodiment of the present invention may further include a metadata processor (VPS/SPS/PPS/SEI/VUI processor).

A video decoder delivers metadata (VPS, SPS, PPS, SEI, and/or VUI), acquired from a video stream, to the metadata processor. VPS, SPS, PPS, SEI, and/or VUI include EOTF parameter information (information described in an EOTF_parameter_info descriptor) including a color_space_type field and a number_of_channels_minus1 field. In an embodiment of the present invention, the video decoder may include the metadata processor, and the video decoder decodes a video stream using EOTF parameter information included in VPS, SPS, and/or PPS.

EOTF parameter information including a color_space_type field and a number_of_channels_minus1 field may be delivered to an HDR display determination unit (HDR display?), an EOTF configuration unit (EOTF adjustment) and a post-processing unit (Post-processing).

The EOTF configuration unit (EOTF adjustment) may reconfigure the EOTF used to encode content using EOTF parameter information. At this time, the EOTF configuration unit may consider the details of the deformation form of an arbitrary EOTF or a specific EOTF through an EOTF_parameter_type field, may consider information about a period existing in a deformed EOTF through a number_of_points field, an EOTF_point_x_index field, and/or an EOTF_point_y_index field, may consider the type of function constituting each period using an EOTF_curve_type field, and may consider information about the coefficient of each function through an EOTF_curve_coefficient_alpha field, an EOTF_curve_coefficient_beta field, and/or an EOTF_curve_ coefficient_gamma field. Furthermore, the EOTF configuration unit may consider information about a color space to which an EOTF is applied through a color_space_type field. Consequently, the EOTF configuration unit may reconfigure an EOTF or an OETF applied to encoding of content at a reception end using the above fields.

A description of units (blocks) shown in this figure is substituted by the description of the units (blocks) of the receiver according to the previous embodiment. Furthermore, a description of the operation of the receiver is substituted by the description of the operation of the receiver according to the previous embodiment.

Figure 20:
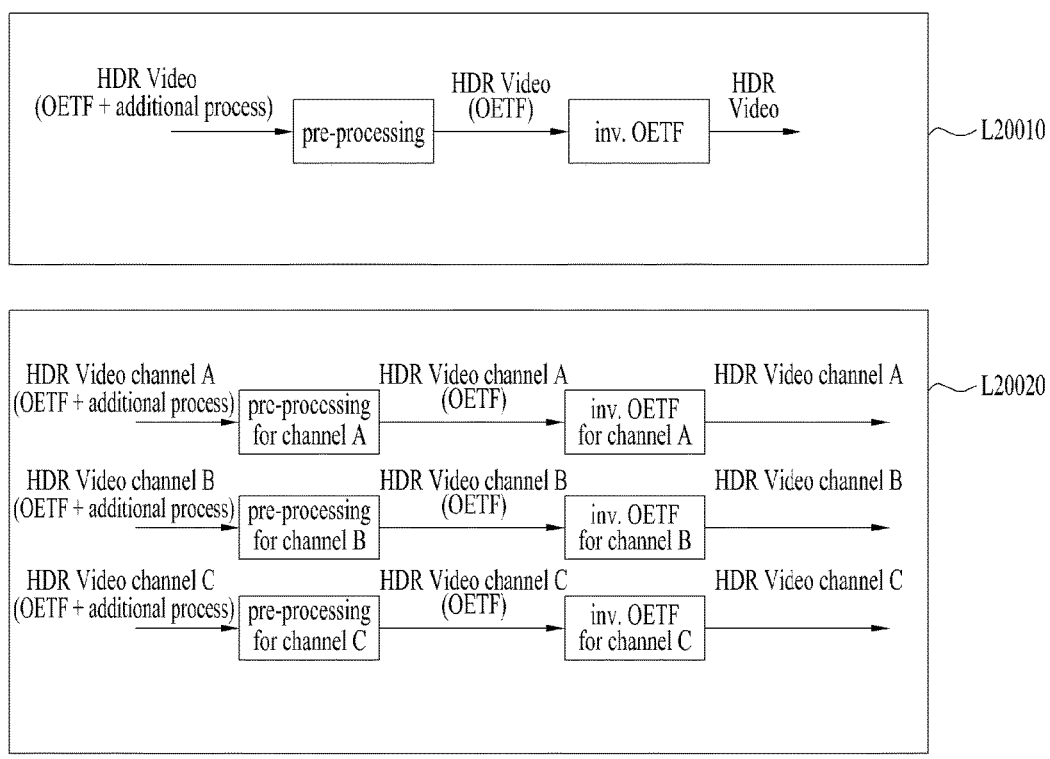
FIG. 20 is a view showing the detailed description of an EOTF configuration unit according to an embodiment of the present invention.

FIG. 20 is a view showing the detailed description of an EOTF configuration unit according to an embodiment of the present invention.

A broadcasting system according to another embodiment of the present invention may apply an EOTF to video, and may further apply an additional conversion function thereto. This process may be performed through a single step or a plurality of separate steps.

In the case in which video is encoded while an EOTF or an OETF is applied thereto, an additional conversion function is applied in order to deform the video based on the features thereof, and the video is then transmitted, a receiver according to another embodiment of the present invention may inversely perform the EOTF application process and the additional conversion function application process, applied during encoding, to acquire video (HDR image).

An embodiment (L20010) shown in the upper end of this figure shows a method of processing video to which an EOTF or an OETF is applied and to which an additional conversion function is further applied. An EOTF configuration unit (L20010) according to an embodiment of the present invention includes a pre-processing processor and/or an EOTF processor (inv. OETF). The pre-processing processor applies the inverse process of additional conversion function processing to video to which a basic EOTF and an additional conversion function are applied in order to generate video to which only the basic EOTF is applied. The EOTF processor may apply the inverse process of basic EOTF processing to the video to which only the basic EOTF is applied and which is output from the pre-processing processor in order to restore linear video.

An embodiment (L20020) shown in the lower end of this figure shows a method of processing video to which a basic EOTF and an additional conversion function are applied for each channel of a color space. In the case in which EOTF parameter information is provided for each channel of a color space, an EOTF configuration unit (L20020) according to an embodiment of the present invention includes a pre-processing processor and/or an EOTF processor for each channel of the color space. The pre-processing processor and the EOTF processor for each channel may apply the inverse process of additional conversion function processing for each channel using EOTF parameter information corresponding to each channel, and may then apply the inverse process of basic EOTF processing in order to restore linear video.

FIG. 21 is a view showing a method of signaling EOTF parameter information according to another embodiment of the present invention.

A broadcasting system according to another embodiment of the present invention may signal EOTF parameter information using VPS, SPS, PPS, VUI, and/or an SEI message.

This figure shows an embodiment of signaling EOTF parameter information using VPS. A broadcasting system according to an embodiment of the present invention may set a vps_extension_flag field of VPS RBSP to 1, and may define a vps_EOTF_parameter_info_flag field and an EOTF_parameter_info descriptor in VPS RBSP in order to signal EOTF parameter information. In the case in which the value of the vps_EOTF_parameter_info_flag field is 1, this indicates that EOTF parameter information (EOTF_parameter_info descriptor) is included in VPS RBSP. In the case in which the value of this field is 0, this indicates that no EOTF parameter information is included therein.

A broadcasting system according to an embodiment of the present invention may define EOTF parameter information in VPS (video parameter set), which indicates the overall features of video, SPS (sequence parameter set), which indicates the overall features of a sequence, PPS (picture parameter set), which indicates the features of each frame, VUI (video usability information), which indicates the features of output video, and/or an SEI (supplemental enhancement information) message. In an embodiment of the present invention, the position at which EOTF parameter information is included may be determined depending on the purpose of use of the information. For example, in the case in which EOTF parameter information is defined in VPS, the information may be applied to all video sequences constituting video service. In the case in which EOTF parameter information is defined in SPS or VUI, the information may be applied to all frames in the video sequence. In the case in which EOTF parameter information is defined in PPS, the information may be applied to the frame. In the case in which EOTF parameter information is changed every frame, the information may be defined in PPS. In the case in which EOTF parameter information is defined in an SEI message, the information may be applied to one frame or all sequences.

A broadcasting system according to an embodiment of the present invention may include relevant signaling information in SPS, VPS, and/or PPS to output video having features described by the signaling information without additional post-processing after decoding. That is, in this embodiment, the output itself of the decoder is video in which features described by the signaling information are reflected, which is different from the operation in which video output from the decoder undergoes post-processing in order to generate video having the features. That is, a broadcasting system according to an embodiment of the present invention may output video having features described by the signaling information at the decoding level without post-processing.

In an embodiment of the present invention, defining signaling information in SPS, VPS, and/or PPS means that the signaling information is essentially used when video is encoded, unlike defining signaling information in SEI and/or VUI, and thus means that video itself encoded by the signaling information is changed. Consequently, the decoder may decode video transmitted thereto only in the case in which signaling information is defined in SPS, VPS, and/or PPS. Without this information, decoding may be impossible.

A sequence of SPS (sequence parameter set) according to an embodiment of the present invention means a set of pictures. For example, in the case in which one video stream includes a base layer and an enhancement layer, each layer may correspond to one sequence. At this time, video of VPS (video parameter set) may indicate a video stream including a base layer and an enhancement layer.

Signaling information, which was described previously or which will be described later, according to an embodiment of the present invention may be signaled while being included in VPS, SPS, PPS, an SEI message, or VUI. Here, the SEI message and VUI include information that is used at the time of post-processing, which is performed after decoding. That is, decoding of a video stream is performed without any problem even though no information is included in the SEI message or VUI. Consequently, information included in the SEI message and VUI may be incidental on video output. However, VPS, SPS, and PPS include information/parameters used when video is encoded. That is, information necessary for decoding, e.g. information defining codec parameters, is included. If no information is included in VPS, SPS, or PPS, therefore, it not possible to decode a video stream. For this reason, this information is essential to output video. In other words, VUI is information indicating the features of output after decoding, and VPS, SPS, and PPS are information used to decode a video stream in order to generate a complete image. Consequently, a transmission end may efficiently encode a video signal using information included in VPS, SPS, and PPS, and a reception end may decode a complete image in the case in which information is included in VPS, SPS, and PPS, signaled by a codec end.

FIG. 22 is a view showing a method of signaling EOTF parameter information according to another embodiment of the present invention.

This figure shows an embodiment of signaling EOTF parameter information using SPS. A broadcasting system according to an embodiment of the present invention may set an sps_extension_present_flag field of SPS RBSP to 1, and may define an sps_EOTF_parameter_info_flag field and an EOTF_parameter_info descriptor in SPS RBSP in order to signal EOTF parameter information. In the case in which the value of the sps_EOTF_parameter_info_flag field is 1, this indicates that EOTF parameter information (EOTF_parameter_info descriptor) is included in SPS RBSP. In the case in which the value of this field is 0, this indicates that no EOTF parameter information is included therein.

FIG. 23 is a view showing a method of signaling EOTF parameter information according to another embodiment of the present invention.

This figure shows an embodiment of signaling EOTF parameter information using PPS. A broadcasting system according to an embodiment of the present invention may set a pps_extension_present_flag field of PPS RBSP to 1, and may define a pps_EOTF_parameter_info_flag field and an EOTF_parameter_info descriptor in PPS RBSP in order to signal EOTF parameter information. In the case in which the value of the pps_EOTF_parameter_info_flag field is 1, this indicates that EOTF parameter information (EOTF_parameter_info descriptor) is included in PPS RBSP. In the case in which the value of this field is 0, this indicates that no EOTF parameter information is included therein.

Figure 24:
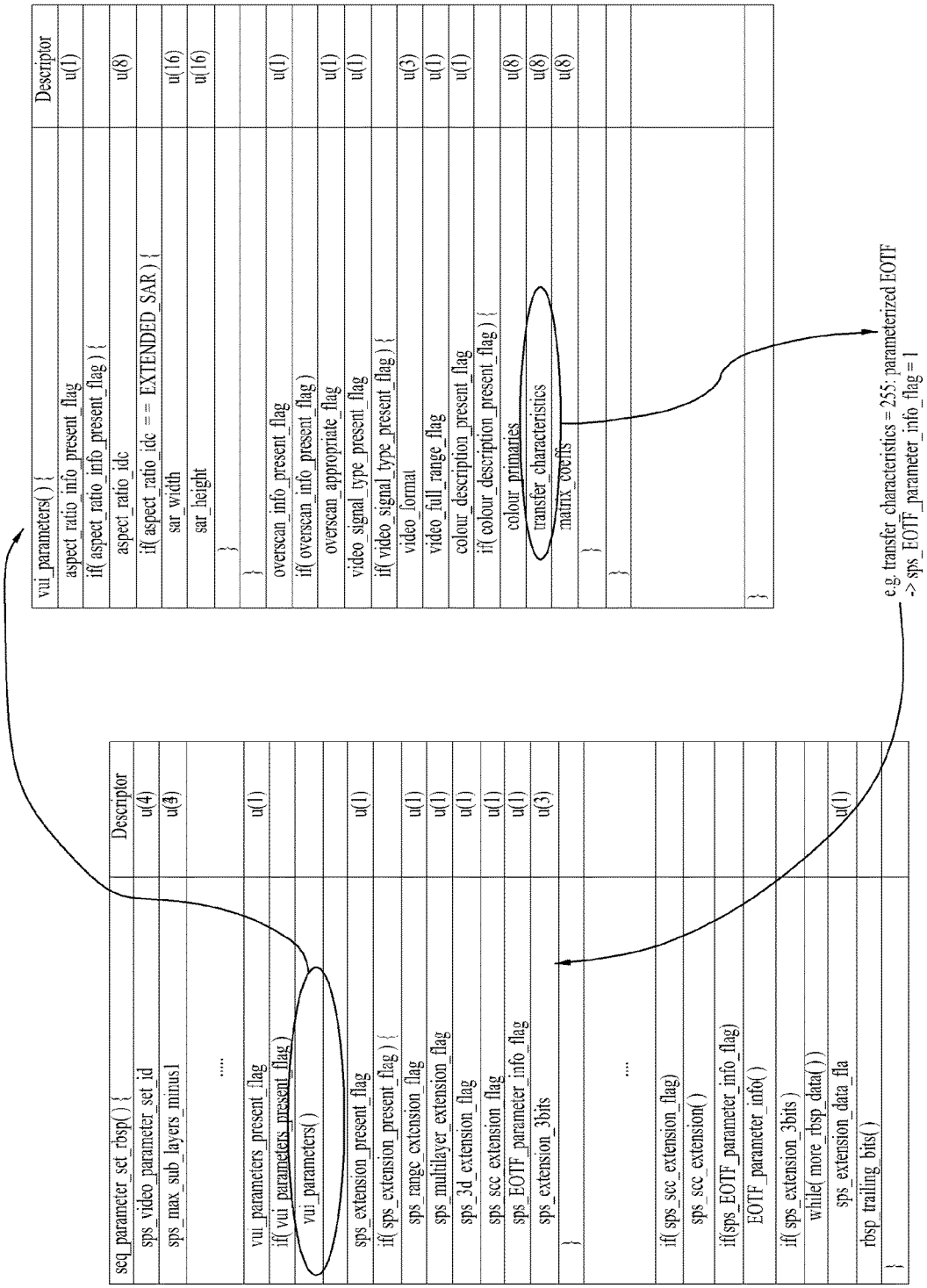
FIG. 24 is a view showing a method of signaling EOTF parameter information according to another embodiment of the present invention.

FIG. 24 is a view showing a method of signaling EOTF parameter information according to another embodiment of the present invention.

A broadcasting system according to another embodiment of the present invention may define EOTF parameter information in VUI in order to signal the information.

A broadcasting system according to another embodiment of the present invention may assign the value of a transfer_characteristics field in VUI to signal the presence of EOTF parameter information, and may signal the EOTF parameter information using VPS, SPS, PPS, and/or an SEI message.

This figure shows an embodiment of signaling EOTF parameter information using SPS. The signaling method according to this figure may also be equally applied to the case in which VPS and/or PPS is used.

Referring to this figure, SPS RBSP according to an embodiment of the present invention includes a vui_parameters descriptor, an sps_EOTF_parameter_info_flag field, and/or an EOTF_parameter_info descriptor.

A broadcasting system according to an embodiment of the present invention may signal that a parameter-based EOTF is used for the video and that EOTF parameter information exists in SPS RBSP using the value of the transfer_characteristics field of the vui_parameters descriptor in SPS RBSP, which is 255. At the same time, the broadcasting system may signal that EOTF parameter information exists in SPS RBSP using the sps_EOTF_parameter_info_flag field in SPS RBSP, and may define the EOTF_parameter_info descriptor in SPS RBSP in order to signal EOTF parameter information.

FIG. 25 is a view showing a method of signaling EOTF parameter information according to another embodiment of the present invention.

A broadcasting system according to an embodiment of the present invention may signal EOTF parameter information through HEVC video.

A broadcasting system according to an embodiment of the present invention may signal EOTF parameter information using an SEI message. Referring to this figure (L25010), the broadcasting system may define an EOTF_parameter_info descriptor in the SEI message.

A broadcasting system according to an embodiment of the present invention may use a transfer_characteristic field of VUI in order to signal that an EOTF or an OETF is used. Referring to this figure (L25020), in the case in which the value of the transfer_characteristic field is 19, this indicates that a variable EOTF (parameterized transfer function; i.e. an EOTF defined by a parameter that is signaled) is used. In the case in which the value of this field is 20, this indicates that a scene-based variable EOTF (scene-based adaptation parameterized transfer function, in which an EOTF is defined by a parameter that is signaled and in which the parameter may be changed based on a time or scene) is used.

In the case in which an EOTF that is based on a parameter and that is changed based on a time or scene is signaled, a broadcasting system according to an embodiment of the present invention may set the value of the transfer_characteristic field to 19, and may signal the EOTF through an EOTF_dynamic_change_flag field, a sync_start field, and/or a sync_duration field in EOTF parameter information.

A broadcasting system according to another embodiment of the present invention may further signal a new EOTF. For example, the system may signal each version of EOTF using the other values of the transfer_characteristic field of VUI.

A broadcasting system according to an embodiment of the present invention may signal brief information about EOTF parameter information through VUI, and may signal detailed information about EOTF parameter information through the SEI message.

Figure 26:
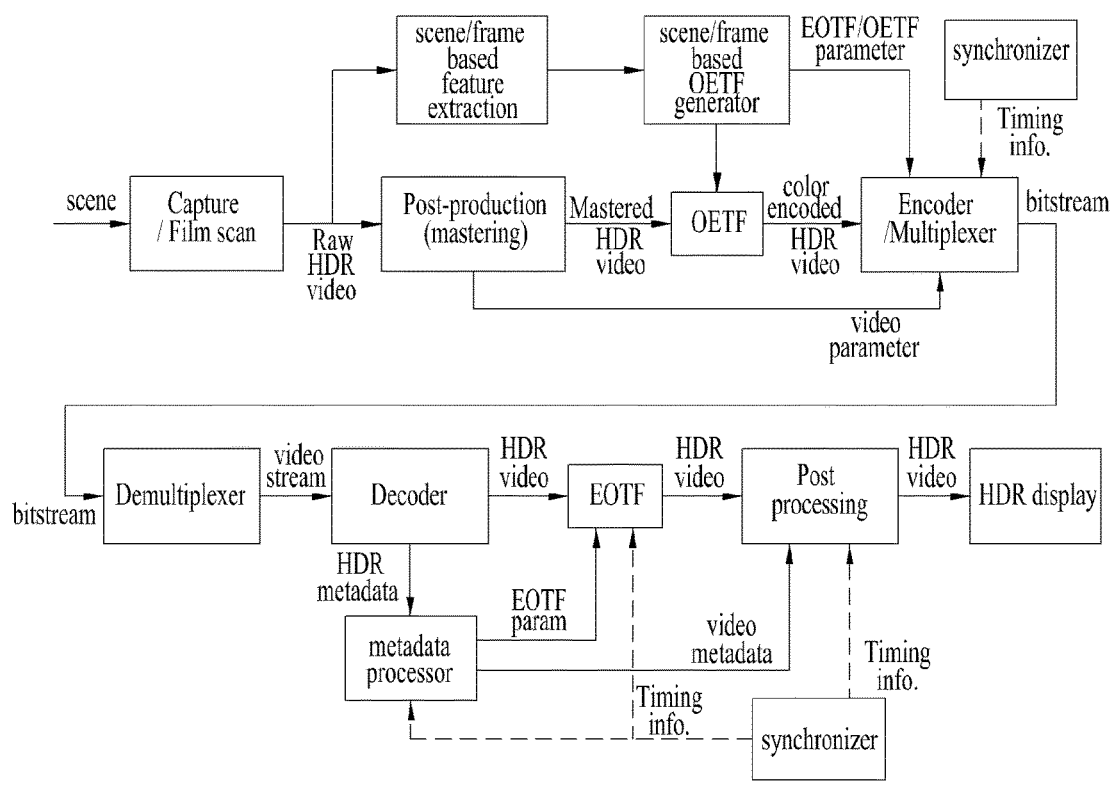
FIG. 26 is a view showing the structure of a transmission and reception system for variable EOTF-based HDR broadcast service according to another embodiment of the present invention.

FIG. 26 is a view showing the structure of a transmission and reception system for variable EOTF-based HDR broadcast service according to another embodiment of the present invention.

A broadcasting system according to another embodiment of the present invention may apply EOTFs that are different depending on time in content or a program. For example, the broadcasting system may use different EOTFs/OETFs depending on the features of video, and may apply an EOTF/OETF in a time-variable manner in consideration of the features of video depending on time.

A transmitter according to an embodiment of the present invention may consider the features of video changed every frame (e.g. the features of information distribution based on brightness) as a criterion for applying different EOTFs/OETFs (scene/frame-based feature extraction). In this case, the transmitter may deliver variable EOTF/OETF information through an appropriate form over time. Furthermore, the transmitter may also deliver information for time synchronization between variable EOTF/OETF information and the video.

A receiver according to an embodiment of the present invention may acquire EOTF parameter information through a video decoder. The acquired information may be used to generate an EOTF that is applied to the video frame.

A broadcasting system according to another embodiment of the present invention may consider the features of bit precision based on the distribution of brightness of video as a criterion for applying different EOTFs/OETFs. In this case, the broadcasting system may variably apply an EOTF in consideration of the features of bit precision based on the distribution of brightness of video.

A broadcasting system according to an embodiment of the present invention further includes a video feature extraction processor (scene/frame based feature extraction), an OETF generation unit (scene/frame based OETF generator), an OETF application unit (OETF), an EOTF application unit (EOTF), and/or a synchronization unit (synchronizer). The video feature extraction processor extracts the features of video changed every scene or every frame from the video. The OETF generation unit generates an EOTF/OETF and EOTF parameter information using the features of the video extracted by the video feature extraction processor. The OETF application unit applies the OETF, generated by the OETF generation unit, to the video. The synchronization unit generates information for synchronization between the generated EOTF parameter information and the video to which the OETF is applied, and delivers the same to an encoder. The EOTF application unit at the reception end performs the inverse process of the OETF applied to the video at the transmission end using the delivered EOTF parameter information. The synchronization unit at the reception end delivers information for synchronization between the EOTF parameter information and the video to a post-processing processor. A description of units (blocks) shown in this figure is substituted by the description of the units (blocks) of the broadcasting system according to the previous embodiment. Furthermore, a description of the operation of the broadcasting system is substituted by the description of the operation of the broadcasting system according to the previous embodiment.

Figure 27:
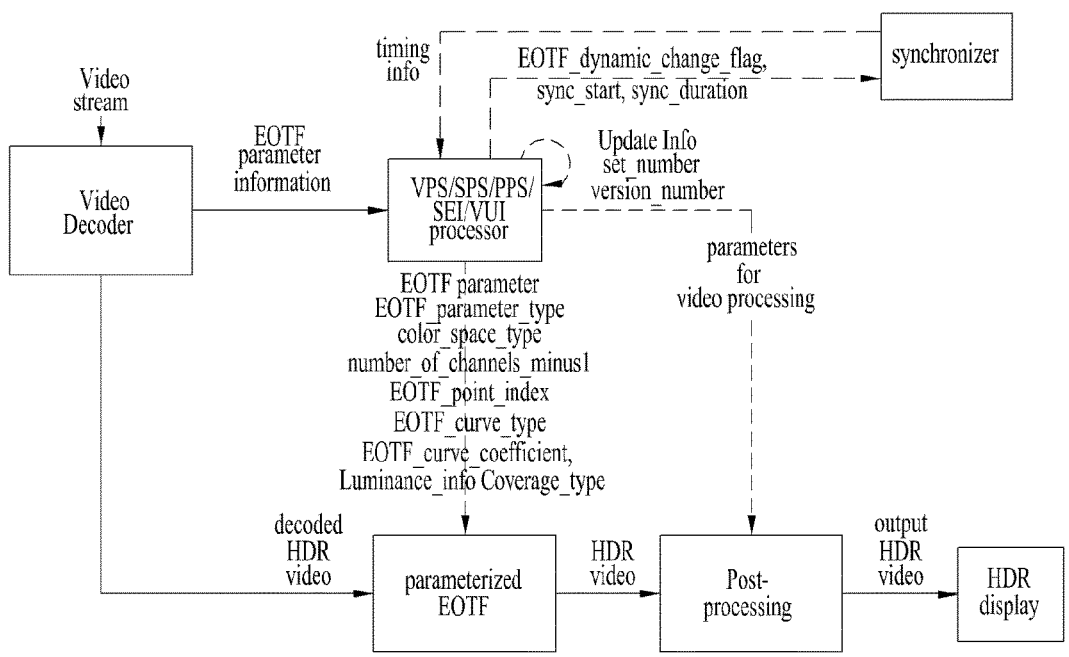
FIG. 27 is a view showing the structure of a receiver according to another embodiment of the present invention.

FIG. 27 is a view showing the structure of a receiver according to another embodiment of the present invention.

A receiver according to another embodiment of the present invention may further include a synchronization unit (synchronizer). A parameterized EOTF block in this figure has the same function as the above-described EOTF configuration unit.

EOTF parameter information including an EOTF_dynamic_change_flag field indicating whether an EOTF is variable may be delivered to an HDR display determination unit (not shown), an EOTF configuration unit (parameterized EOTF), and a post-processing unit (Post-processing). At this time, parameters for video processing may be delivered from a metadata processor (VPS/SPS/PPS/SEI/VUI processor) to the post-processing unit.

In an embodiment of the present invention, in the case in which EOTF_dynamic_change_flag included in EOTF parameter information is 0, the same EOTF may be applied to all content. In the case in which EOTF_dynamic_change_flag is 1, EOTF parameter information may be applied only to a given range of time. At this time, a synchronization unit according to an embodiment of the present invention may synchronize sync_start information indicating a start time point at which a specific EOTF is applied and sync_duration information indicating the length of a period in which a specific EOTF is applied with internal system time such that the EOTF can be correctly applied to the frame or scene of the video.

A metadata processor according to an embodiment of the present invention may update EOTF parameter information using set_number information and/or version_number information included in the EOTF parameter information.

A receiver according to an embodiment of the present invention may determine whether an EOTF is fixedly applied to content or is variably applied to content over time. In the case in which an EOTF is variably applied to content, the receiver may perform the inverse process of the EOTF every scene or every frame using EOTF parameter information in order to restore linear video from a transmission end.

A description of units (blocks) shown in this figure is substituted by the description of the units (blocks) of the receiver according to the previous embodiment. Furthermore, a description of the operation of the receiver is substituted by the description of the operation of the receiver according to the previous embodiment.

FIG. 28 is a view showing the syntax of an EOTF_parameter_info descriptor according to another embodiment of the present invention.

A broadcasting system according to another embodiment of the present invention may provide an EOTF_parameter_info descriptor enabling EOTF parameter information to be applied only to a specific range of time.

An EOTF_parameter_info descriptor according to another embodiment of the present invention further includes an EOTF_dynamic_change_flag field, a total_number_of_sets field, a set number field, a version_number field, a sync_info_type field, a sync_start field, an EOTF_info_type field, and/or a sync_duration field. A description of respective fields in this descriptor shown in this figure is substituted by the description of the above-described fields having the same names.

The EOTF_dynamic_change_flag field indicates whether an EOTF applied to video is changed (modified) every specific unit of content or a program. In the case in which the value of this field is 0, this indicates that an EOTF is not changed. In the case in which the value of this field is 1, this indicates that an EOTF is changed. This field may be used for a fixed standard EOTF as well as an EOTF defined by parameters according to an embodiment of the present invention (parameterized EOTF). At this time, an EOTF defined by parameters (parameterized EOTF) has a plurality of periods, each of which is constituted by a function. A function corresponding to each period indicates an EOTF defined by parameters. In an embodiment of the present invention, in the case in which the value of this field is 1, one EOTF_parameter_info descriptor describes information about an EOTF applied to one unit. Alternatively, this field may indicate whether different EOTFs are applied to every specific unit in video.

The total_number_of_sets field indicates the total number of EOTF sets, each of which is applied to one unit, existing in content. Alternatively, this field may indicate the number of EOTFs applied to video.

The set_number field indicates the identification number of the current EOTF_parameter_info descriptor. This field may serve to delimit a plurality of EOTF_parameter_info descriptors when the EOTF_parameter_info descriptors are delivered in time units or in frame units. In an embodiment of the present invention, in the case in which a plurality of descriptors is defined for common, frame, scene, etc., this field may identify each descriptor in connection with the EOTF_info_type field. For example, descriptors having the same EOTF_info_type and different values of set_number may be identified as descriptors constituting the same content or program.

The version_number field indicates the version of the EOTF_parameter_info descriptor. This field may indicate that information in the current descriptor is changed in connection with the EOTF_info_type field and/or the set_number field. For example, in the case in which descriptors having the same EOTF_info_type and set_number have the same version_number, a receiver may apply EOTF parameter information in a metadata buffer to video without being changed. In the case in which the descriptors have different values of version_number, the receiver may update the EOTF parameter information in the metadata buffer, and may apply new information to the video.

The sync_info_type field indicates a method of expressing information for synchronization with content, a scene, a clip, or a frame to which information in the EOTF_parameter_info descriptor is to be applied. For example, a broadcasting system may deliver a POC (Picture order count) value used in a decoder using this field, or may directly deliver a pic_order_count_lsb value. For storage media, the broadcasting system may use media time information as a method of expressing information for synchronization, and may use the number of accumulated frames based on a reference time for video start as a method of expressing information for synchronization. In an embodiment of the present invention, in the case in which the value of this field is 0x00, this indicates that information for synchronization is expressed as time. In the case in which the value of this field is 0x01, this indicates that information for synchronization is expressed as a time difference. In the case in which the value of this field is 0x02, this indicates that information for synchronization is expressed as a start order. In the case in which the value of this field is 0x03, this indicates that information for synchronization is expressed as POC. In the case in which the value of this field is 0x04, this indicates that information for synchronization is expressed as PTS (presentation time stamp). In the case in which the value of this field is 0x05, this indicates that information for synchronization is expressed as the number of accumulated frames based on a reference time. In another embodiment of the present invention, in the case in which information is correctly delivered every frame to which the information is to be applied, the sync_info_type field, the sync_start field, and/or the sync_duration field may not be used. Here, information for synchronization means sync_start information and/or sync_duration information.

The sync_start field indicates information related to the point at which synchronization starts. In an embodiment of the present invention, in the case in which information is not delivered every frame, i.e. in the case in which information is delivered every specific cycle, such as RAP, it is necessary to connect the start and the end of a period/frame in which the information is used to a video frame. At this time, a broadcasting system according to an embodiment of the present invention may indicate start information of the period/frame to which the information is applied using sync_start as information such as time, POC, the number of frames, and PTS in connection with sync_info_type. For example, an embodiment may be configured such that, for a 50 fps video stream having a RAP interval of 2 seconds, 3 metadata are applied at 2 seconds (start point), 2.5 seconds, and 3.5 seconds within a RAP period between 2 and 4 seconds. In this embodiment, in the case in which Sync_info_type=0x00, the broadcasting system may deliver sync_start of the respective metadata as 2000 (ms), 2500, and 3500, and may further signal sync_duration as 500 (ms), 1000, and 1000. At this time, a time reference may be necessary for timer determination. The broadcasting system may signal a time reference using additional information. For example, the broadcasting system may define time in an adaptation field of a TS header. In the case in which Sync_info_type=0x01, the broadcasting system may signal sync_start as 0 (ms), 500, and 1000 to signal that metadata are immediately applied, metadata are applied 0.5 seconds after RAP, and metadata are applied 1.5 seconds after RAP. In the case in which Sync_info_type=0x02, the broadcasting system may provide notification of a sequence such as sync_start=0, 1, and 2. In the case of 0, the broadcasting system may signal that metadata must be immediately applied. In the case of 1, the broadcasting system may signal that metadata must be applied after RAP+0.5 seconds. In the case of 2, the broadcasting system may signal that metadata must be applied after RAP+1.5 seconds. In the case in which Sync_info_type=0x03, the broadcasting system may deliver the POC value of video when metadata are applied as 100, 125, and 175 (duration may also be delivered as 25, 50, and 50 depending on POC units), or may directly deliver a value associated with POC in a video codec syntax. Furthermore, even in the case in which POC, PTS, and the number of frames are signaled, the time at which metadata are applied may be indicated through information about POC, PTS, and the number of frames, similarly to the above example. Alternatively, this field may indicate start information of a specific unit in video to which EOTF parameter information is applied.

The sync_duration field indicates a time during which synchronization lasts after synchronization start (sync_start). Like the previous embodiment, a synchronization end time may be calculated as sync_start+sync_duration. In another embodiment of the present invention, a broadcasting system may directly signal information about the synchronization end time. In an embodiment of the present invention, the broadcasting system may set the value of this field to a predetermined value such as FFFF, since the end time cannot be set in advance for a live broadcast. In another embodiment of the present invention, in the case in which a metadata application time can be determined using only sync_start information, the broadcasting system may not use the sync_duration field. In this case, the sync_duration field may be used as a field signaling additional information indicating whether metadata other than the given metadata are transmitted after the given metadata.

A transition_flag field indicates an end time of content associated with metadata described by the current descriptor. Alternatively, this field may indicate an end time of a unit or a period to which metadata described by the current descriptor is applied. For example, in the case in which HDR content is finished and switching to SDR content is performed, the broadcasting system may set transition_flag, pertaining to the last frame of the HDR content, to 1. In another embodiment of the present invention, this field may indicate that the frame to which information indicated by the EOTF_parameter_info descriptor is applied is finished. In another embodiment of the present invention, this field may indicate that the use of the EOTF_parameter_info descriptor is interrupted. In an embodiment of the present invention, the receiver may determine power on/off of a module related to the EOTF_parameter_info descriptor based on this field. In an embodiment of the present invention, in the case in which the receiver is divided into a STB and a display device, which are connected to each other via a wired/wireless interface (e.g. HDMI, a display port, or an MHL), information indicating that the information is no longer provided may be delivered to the display device. In an embodiment of the present invention, a frame to which the application of the EOTF_parameter_info descriptor is finished may be signaled, since the transition_flag field indicates the end time. In another embodiment of the present invention, the broadcasting system may signal the frame to which the application of the EOTF_parameter_info descriptor is finished in a RAP group including an end frame in the case in which a promise is given in advance.

The EOTF_info_type field indicates the unit to which information in the EOTF_parameter_info descriptor is applied. Alternatively, this field indicates the type of information in the EOTF_parameter_info descriptor. In an embodiment of the present invention, information in the EOTF_parameter_info descriptor may be information about an EOTF of a mastering display or a camera. In this case, this field may indicate the target (mastering display or camera) to which the information is applied. In another embodiment of the present invention, information in the EOTF_parameter_info descriptor may be applied to one unit, such as one channel, one program, or one piece of content, or may be applied to one unit, such as one scene, one video clip, or one frame. In this case, this field may indicate the unit to which the information is applied. In another embodiment of the present invention, this field may indicate whether information in the EOTF_parameter_info descriptor is information before conversion or information after conversion, may indicate the type of transport format of information in the EOTF_parameter_info descriptor, may indicate the target format of information in the EOTF_parameter_info descriptor after conversion, and may indicate whether information in the EOTF_parameter_info descriptor is static metadata or dynamic metadata. In an embodiment of the present invention, this field may identify the type of EOTF parameter information defined in the current payloadType (in the current EOTF_parameter_info descriptor). In an embodiment of the present invention, only information corresponding to one EOTF_info_type may be described in one payloadType (in one EOTF_parameter_info descriptor). In another embodiment of the present invention, information corresponding to two or more EOTF_info_types may be described in one payloadType (in one EOTF_parameter_info descriptor). In this case, the broadcasting system may configure syntax such that information sorted according to EOTF_info_type is successively located. In an embodiment of the present invention, in the case in which the value of this field is 0000, this indicates that the information pertains to a mastering display. In the case in which the value of this field is 0001, this indicates that the information pertains to a camera. In the case in which the value of this field is 0011, this indicates that the information is applied in program units. In the case in which the value of this field is 0100, this indicates that the information is applied in content units. In the case in which the value of this field is 0101, this indicates that the information is applied in scene units. In the case in which the value of this field is 0110, this indicates that the information is applied in video clip units. In the case in which the value of this field is 0111, this indicates that the information is applied in frame units. Here, that information in the EOTF_parameter_info descriptor is applied in channel units indicates that information included in the current descriptor is effective for a specific channel and that information included in the next descriptor must be used for other channels.

FIG. 29 is a view showing the description of the value of a sync_info_type field and an EOTF_info_type field according to an embodiment of the present invention.

A detailed description of this figure corresponds to the description of the corresponding part of the previous figure.

Figure 30:
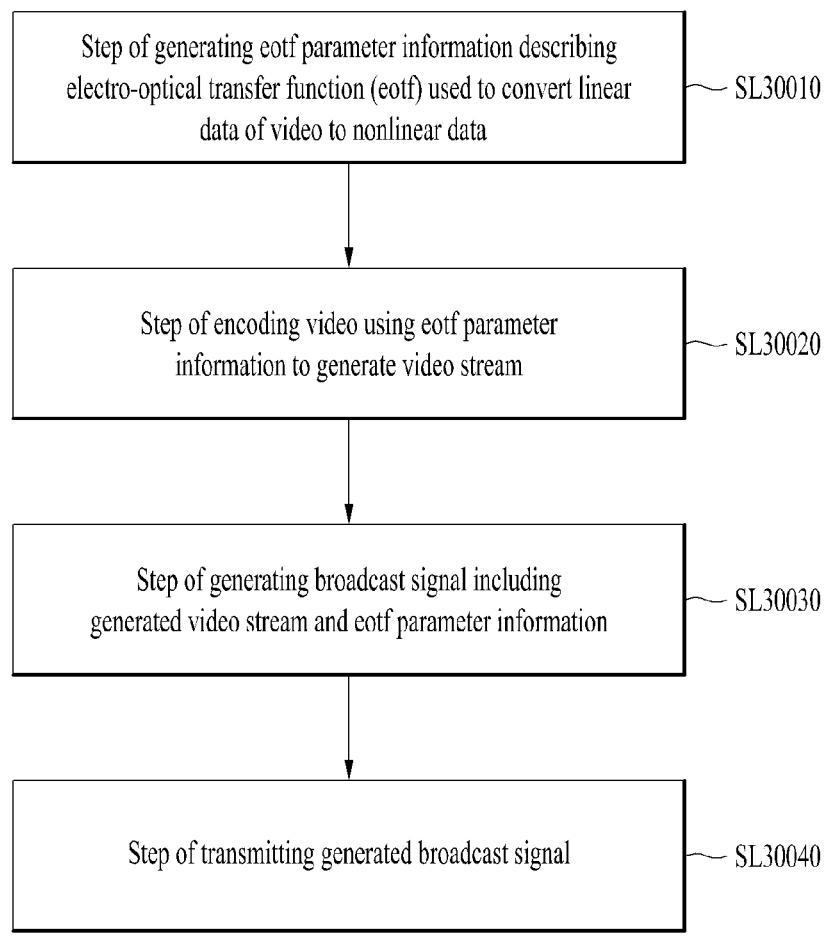
FIG. 30 is a view showing a broadcast signal transmission method according to an embodiment of the present invention.

FIG. 30 is a view showing a broadcast signal transmission method according to an embodiment of the present invention.

A broadcast signal transmission method according to an embodiment of the present invention may include a step of generating EOTF parameter information describing an electro-optical transfer function (EOTF) used to convert linear data of video to nonlinear data (SL30010), a step of encoding the video using the EOTF parameter information to generate a video stream (SL30020), a step of generating a broadcast signal including the generated video stream and the EOTF parameter information (SL30030), and/or a step of transmitting the generated broadcast signal (SL30040). Here, the EOTF parameter information may include flag information indicating whether the conversion of a color space is necessary in order to apply the EOTF, color space type information indicating the type of the color space to which the EOTF is applied, number-of-color-channels information indicating the number of color channels to which the EOTF is applied, and parameter information defining the EOTF applied to the color channels in the color space.

In another embodiment of the present invention, the EOTF parameter information may include flag information indicating whether different EOTFs are applied to every specific unit in the video, and in the case in which different EOTFs are applied to every specific unit in the video, a plurality of EOTF parameter information may be generated, and the EOTF parameter information may describe an EOTF applied to the specific unit.

In another embodiment of the present invention, the EOTF parameter information may include information indicating the total number of EOTFs applied to every specific unit in the video, identification number information identifying the EOTF parameter information from the plurality of pieces of EOTF parameter information, and version information indicating whether an information change exists in the EOTF parameter information.

In another embodiment of the present invention, the EOTF parameter information may include synchronization start time information indicating start information of a specific unit in the video to which the EOTF parameter information is applied, synchronization duration time information indicating duration time information of a specific unit in the video to which the EOTF parameter information is applied, and synchronization expression type information indicating a method of expressing the synchronization start time information or the synchronization duration time information.

In another embodiment of the present invention, the EOTF parameter information may include information indicating an end time of content associated with the EOTF parameter information and information indicating the unit in the video to which the EOTF parameter information is applied.

In another embodiment of the present invention, the EOTF parameter information may be included in video parameter information defining parameters for encoding of the video, and the video parameter information may correspond to at least one of a sequence parameter set (SPS), a video parameter set (VPS), and a picture parameter set (PPS).

Figure 31:
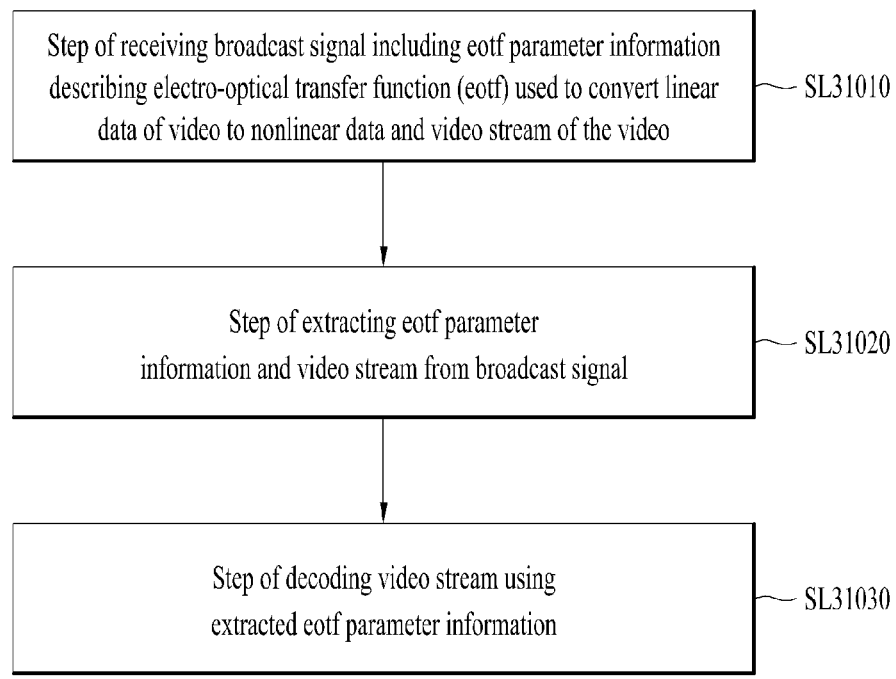
FIG. 31 is a view showing a broadcast signal reception method according to an embodiment of the present invention.

FIG. 31 is a view showing a broadcast signal reception method according to an embodiment of the present invention.

A broadcast signal reception method according to an embodiment of the present invention may include a step of receiving a broadcast signal including EOTF parameter information describing an electro-optical transfer function (EOTF) used to convert linear data of video to nonlinear data and a video stream of the video (SL31010), a step of extracting the EOTF parameter information and the video stream from the broadcast signal (SL31020), and/or a step of decoding the video stream using the extracted EOTF parameter information (SL31030). Here, the EOTF parameter information may include flag information indicating whether the conversion of a color space is necessary in order to apply the EOTF, color space type information indicating the type of the color space to which the EOTF is applied, number-of-color-channels information indicating the number of color channels to which the EOTF is applied, and parameter information defining the EOTF applied to the color channels in the color space.

In another embodiment of the present invention, the EOTF parameter information may include flag information indicating whether different EOTFs are applied to every specific unit in the video, and in the case in which different EOTFs are applied to every specific unit in the video, a plurality of EOTF parameter information may be generated, and the EOTF parameter information may describe an EOTF applied to the specific unit.

In another embodiment of the present invention, the EOTF parameter information may include information indicating the total number of EOTFs applied to every specific unit in the video, identification number information identifying the EOTF parameter information from the plurality of pieces of EOTF parameter information, and version information indicating whether an information change exists in the EOTF parameter information.

In another embodiment of the present invention, the EOTF parameter information may include synchronization start time information indicating start information of a specific unit in the video to which the EOTF parameter information is applied, synchronization duration time information indicating duration time information of a specific unit in the video to which the EOTF parameter information is applied, and synchronization expression type information indicating a method of expressing the synchronization start time information or the synchronization duration time information.

In another embodiment of the present invention, the EOTF parameter information may include information indicating an end time of content associated with the EOTF parameter information and information indicating the unit in the video to which the EOTF parameter information is applied.

In another embodiment of the present invention, the EOTF parameter information may be included in video parameter information defining parameters for encoding of the video, and the video parameter information may correspond to at least one of a sequence parameter set (SPS), a video parameter set (VPS), and a picture parameter set (PPS).

Figure 32:
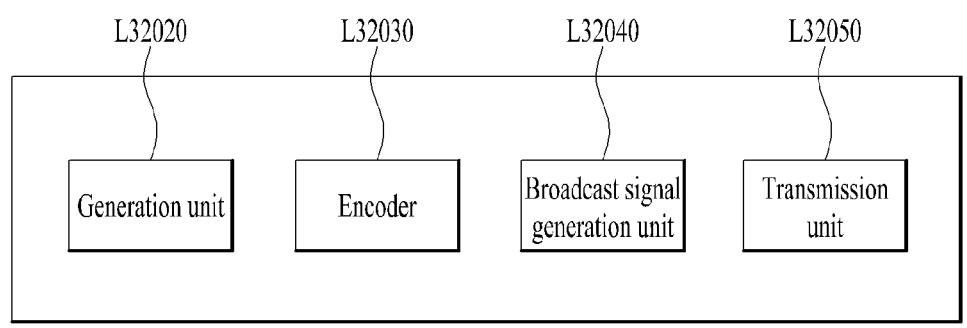
FIG. 32 is a view showing the structure of a broadcast signal transmission apparatus according to an embodiment of the present invention.

FIG. 32 is a view showing the structure of a broadcast signal transmission apparatus according to an embodiment of the present invention.

A broadcast signal transmission apparatus LS32010 according to an embodiment of the present invention may include a generation unit L32020 for generating EOTF parameter information describing an electro-optical transfer function (EOTF) used to convert linear data of video to nonlinear data, an encoder L32030 for encoding the video using the EOTF parameter information to generate a video stream, a broadcast signal generation unit L32040 for generating a broadcast signal including the generated video stream and the EOTF parameter information, and/or a transmission unit L32050 for transmitting the generated broadcast signal. The EOTF parameter information may include flag information indicating whether the conversion of a color space is necessary in order to apply the EOTF, color space type information indicating the type of the color space to which the EOTF is applied, number-of-color-channels information indicating the number of color channels to which the EOTF is applied, and parameter information defining the EOTF applied to the color channels in the color space.

Figure 33:
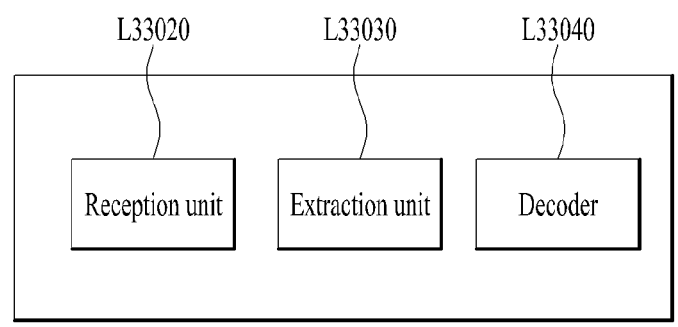
FIG. 33 is a view showing the structure of a broadcast signal reception apparatus according to an embodiment of the present invention.

FIG. 33 is a view showing the structure of a broadcast signal reception apparatus according to an embodiment of the present invention.

A broadcast signal reception apparatus L33010 according to an embodiment of the present invention may include a reception unit L33020 for receiving a broadcast signal including EOTF parameter information describing an electro-optical transfer function (EOTF) used to convert linear data of video to nonlinear data and a video stream of the video, an extraction unit L33030 for extracting the EOTF parameter information and the video stream from the broadcast signal, and/or a decoder L33040 for decoding the video stream using the extracted EOTF parameter information. Here, the EOTF parameter information may include flag information indicating whether the conversion of a color space is necessary in order to apply the EOTF, color space type information indicating the type of the color space to which the EOTF is applied, number-of-color-channels information indicating the number of color channels to which the EOTF is applied, and parameter information defining the EOTF applied to the color channels in the color space.

Modules or units may be processors that execute consecutive processes stored in a memory (or a storage unit). The steps described in the above-described embodiments may be performed by hardware/processors. The modules/blocks/units described in the above-described embodiments may operate as hardware/processors. In addition, the methods proposed by the present invention may be executed as code. Such code may be written on a processor-readable storage medium and thus may be read by a processor provided by an apparatus.

While the present invention has been described with reference to separate drawings for the convenience of description, new embodiments may be implemented by combining the embodiments illustrated in the respective drawings. As needed by those skilled in the art, designing a computer-readable recording medium, in which a program for implementing the above-described embodiments is recorded, falls within the scope of the present invention.

The apparatus and method according to the present invention are not limitedly applied to the constructions and methods of the embodiments as previously described; rather, all or some of the embodiments may be selectively combined to achieve various modifications.

Meanwhile, the method proposed by the present invention may be implemented as code that can be written on a processor-readable recording medium and thus read by a processor provided in a network device. The processor-readable recording medium may be any type of recording device in which data are stored in a processor-readable manner. The processor-readable recording medium may include, for example, read-only memory (ROM), random access memory (RAM), compact disc read-only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that such modifications and variations should not be understood independently of the technical spirit or prospect of the present specification.

In addition, the present specification describes both a product invention and a method invention, and descriptions of the two inventions may be complementarily applied as needed.

Those skilled in the art will appreciate that the present invention may be carried out in other specific ways than those set forth herein without departing from the spirit or essential characteristics of the present invention. Therefore, the scope of the invention should be determined by the appended claims and their legal equivalents, rather than by the above description, and all changes that fall within the meaning and equivalency range of the appended claims are intended to be embraced herein.

This specification describes both an apparatus invention and a method invention, and descriptions of the apparatus and method inventions may be complementarily applied.

Mode for Invention

Various embodiments have been described in the best mode for carrying out the invention.

INDUSTRIAL APPLICABILITY

The present invention is used in various broadcast signal provision fields.

Those skilled in the art will appreciate that the present invention may be carried out in other specific ways than those set forth herein without departing from the spirit or essential characteristics of the present invention. Therefore, the scope of the invention should be determined by the appended claims and their legal equivalents, rather than by the above description, and all changes that fall within the meaning and equivalency range of the appended claims are intended to be embraced herein.

The invention claimed is:

1. A broadcast signal transmission method comprising:
generating EOTF parameter information describing an electro-optical transfer function (EOTF) used to convert linear data of video to nonlinear data, wherein the EOTF parameter information includes first flag information for indicating whether a conversion of a color space is necessary in order to apply the EOTF, color space type information for indicating a type of the color space to which the EOTF is applied, number-of-color-channels information for indicating a number of color channels to which the EOTF is applied, parameter information defining the EOTF applied to the color channels in the color space, second flag information for indicating whether different EOTFs are applied to every specific unit in the video, and wherein, in a case in which the different EOTFs are applied to the every specific unit in the video, a plurality of EOTF parameter information are generated;
encoding the video using the EOTF parameter information to generate a video stream;
generating a broadcast signal including the generated video stream and the EOTF parameter information; and
transmitting the generated broadcast signal.

2. The broadcast signal transmission method according to claim 1, wherein the EOTF parameter information further includes information for indicating a total number of EOTFs applied to every specific unit in the video, identification number information for identifying the EOTF parameter information from the plurality of pieces of EOTF parameter information, and version information for indicating whether an information change exists in the EOTF parameter information.

3. The broadcast signal transmission method according to claim 1, wherein the EOTF parameter information further includes synchronization start time information for indicating start information of a specific unit in the video to which the EOTF parameter information is applied, synchronization duration time information for indicating duration time information of a specific unit in the video to which the EOTF parameter information is applied, and synchronization expression type information for indicating a method of expressing the synchronization start time information or the synchronization duration time information.

4. The broadcast signal transmission method according to claim 1, wherein the EOTF parameter information further includes information for indicating an end time of content associated with the EOTF parameter information and information for indicating a unit in the video to which the EOTF parameter information is applied.

5. The broadcast signal transmission method according to claim 1, wherein the EOTF parameter information is contained in video parameter information defining parameters for encoding of the video and wherein the video parameter information corresponds to at least one of a sequence parameter set (SPS), a video parameter set (VPS), and a picture parameter set (PPS).

6. A broadcast signal reception method comprising:
receiving a broadcast signal including EOTF parameter information describing an electro-optical transfer function (EOTF) used to convert linear data of video to nonlinear data and a video stream of the video, wherein the EOTF parameter information includes first flag information for indicating whether a conversion of a color space is necessary in order to apply the EOTF, color space type information for indicating a type of the color space to which the EOTF is applied, number-of-color-channels information for indicating a number of color channels to which the EOTF is applied, parameter information defining the EOTF applied to the color channels in the color space, second flag information for indicating whether different EOTFs are applied to every specific unit in the video, and wherein, in a case in which the different EOTFs are applied to the every specific unit in the video, a plurality of EOTF parameter information are generated;

extracting the EOTF parameter information and the video stream from the broadcast signal; and decoding the video stream using the extracted EOTF parameter information.

7. The broadcast signal reception method according to claim 6, wherein the EOTF parameter information further includes information for indicating a total number of EOTFs applied to every specific unit in the video, identification number information for identifying the EOTF parameter information from the plurality of EOTF parameter information, and version information for indicating whether an information change exists in the EOTF parameter information.

8. The broadcast signal reception method according to claim 6, wherein the EOTF parameter information further includes synchronization start time information for indicating start information of a specific unit in the video to which the EOTF parameter information is applied, synchronization duration time information for indicating duration time information of a specific unit in the video to which the EOTF parameter information is applied, and synchronization expression type information for indicating a method of expressing the synchronization start time information or the synchronization duration time information.

9. The broadcast signal reception method according to claim 6, wherein the EOTF parameter information further includes information for indicating an end time of content associated with the EOTF parameter information and information for indicating a unit in the video to which the EOTF parameter information is applied.

10. The broadcast signal reception method according to claim 6, wherein the EOTF parameter information is contained in video parameter information defining parameters for encoding of the video and wherein the video parameter information corresponds to at least one of a sequence parameter set (SPS), a video parameter set (VPS), and a picture parameter set (PPS).

11. A broadcast signal transmission apparatus comprising:
a generation unit for generating EOTF parameter information describing an electro-optical transfer function (EOTF) used to convert linear data of video to nonlinear data, wherein the EOTF parameter information includes first flag information for indicating whether a conversion of a color space is necessary in order to apply the EOTF, color space type information for indicating a type of the color space to which the EOTF is applied, number-of-color-channels information for indicating a number of color channels to which the EOTF is applied, and parameter information defining the EOTF applied to the color channels in the color space, second flag information for indicating whether different EOTFs are applied to every specific unit in the video, and wherein, in a case in which the different EOTFs are applied to the every specific unit in the video, a plurality of EOTF parameter information are generated;

an encoder for encoding the video using the EOTF parameter information to generate a video stream;

a broadcast signal generation unit for generating a broadcast signal including the generated video stream and the EOTF parameter information; and a transmission unit for transmitting the generated broadcast signal.

12. A broadcast signal reception apparatus comprising:
a reception unit for receiving a broadcast signal including EOTF parameter information describing an electro-optical transfer function (EOTF) used to convert linear data of video to nonlinear data and a video stream of the video, wherein the EOTF parameter information includes first flag information for indicating whether a conversion of a color space is necessary in order to apply the EOTF, color space type information for indicating a type of the color space to which the EOTF is applied, number-of-color-channels information for indicating a number of color channels to which the EOTF is applied, and parameter information defining the EOTF applied to the color channels in the color space, second flag information for indicating whether different EOTFs are applied to every specific unit in the video, and wherein, in a case in which the different EOTFs are applied to the every specific unit in the video, a plurality of EOTF parameter information are generated;

an extraction unit for extracting the EOTF parameter information and the video stream from the broadcast signal; and a decoder for decoding the video stream using the extracted EOTF parameter information.

* * * * *